(12) United States Patent
Hirano et al.

(10) Patent No.: US 7,317,856 B2
(45) Date of Patent: Jan. 8, 2008

(54) METHOD OF MAKING OPTICAL FIBER AND OPTICAL FIBER MADE BY THE METHOD

(75) Inventors: Masaaki Hirano, Yokohama (JP); Kazumasa Makihara, Yokohama (JP); Tetsuya Nakanishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 16 days.

(21) Appl. No.: 11/398,769

(22) Filed: Apr. 6, 2006

(65) Prior Publication Data

US 2006/0245705 A1 Nov. 2, 2006

(30) Foreign Application Priority Data

Apr. 11, 2005 (JP) ............................. 2005-113821

(51) Int. Cl.
- *G02B 6/02* (2006.01)
- *G02B 6/028* (2006.01)
- *G02B 6/032* (2006.01)
- *G02B 6/036* (2006.01)
- *C03B 37/023* (2006.01)
- *C03B 37/028* (2006.01)
- *C03B 37/02* (2006.01)
- *C03B 37/025* (2006.01)

(52) U.S. Cl. .................... 385/123; 385/124; 385/125; 385/126; 385/127; 385/128; 65/385; 65/411; 65/435

(58) Field of Classification Search ........ 385/123–128; 65/385, 411, 435
See application file for complete search history.

(56) References Cited

U.S. PATENT DOCUMENTS 6,522,818 B1   2/2003   Aso et al.

(Continued)

FOREIGN PATENT DOCUMENTS

| JP | 2000-347228 | 12/2000 |
|----|-------------|---------|
| JP | 2002-293563 | 10/2002 |
| JP | 2003-020239 | 1/2003 |
| JP | 2003-040636 | 2/2003 |
| JP | 2004-029441 | 1/2004 |

OTHER PUBLICATIONS

Legrand et al., "Impact of the longitudinal variations of the chromatic dispersion of the gain of fiber parametric amplifiers", Optical Society of America, 2003, pp. 261-263.

(Continued)

*Primary Examiner*—Frank G. Font
*Assistant Examiner*—Jerry Martin Blevins
(74) *Attorney, Agent, or Firm*—McDermott Will & Emery LLP

(57) ABSTRACT

Provided is a method of manufacturing an optical fiber preform from which an optical fiber having the desired characteristics can easily be produced. The method comprises the steps of: (1) preparing an intermediate preform for manufacturing an optical fiber preform; (2) measuring a refractive index profile in a radial direction at each of a plurality of positions in the longitudinal direction of the intermediate preform; (3) demarcating the outer diameter shape of the intermediate preform based on the result of the step of measuring the refractive index profile so that an optical fiber preform can be manufactured such that an optical fiber having the desired characteristics may be produced from the optical fiber preform; (4) elongating the outer periphery of the intermediate preform so that the outer diameter shape may be formed as demarcated in the step of demarcating the outer diameter shape; and (5) drawing, so as to have a substantially constant outer diameter, the intermediate preform that has been subjected to the grinding step.

9 Claims, 14 Drawing Sheets

U.S. PATENT DOCUMENTS

| | | | | |
|---|---|---|---|---|
| 6,938,443 | B1* | 9/2005 | Fabian | 65/412 |
| 2002/0041746 | A1* | 4/2002 | Kato et al. | 385/123 |
| 2002/0174689 | A1* | 11/2002 | Onishi et al. | 65/378 |
| 2005/0126227 | A1* | 6/2005 | Collaro | 65/378 |
| 2005/0163444 | A1* | 7/2005 | Miyabe et al. | 385/127 |

OTHER PUBLICATIONS

Mussot et al., "Zero-dispersion wavelength mapping of a highly nonlinear optical fibre-based parametric amplifier", ECOC 2004 Proceedings—vol. 2, pp. 190-191.

Watanabe et al., "Interband Wavelength Conversion of 320 Gb/s (32×10 Gb/s) WDM Signal Using a Polarization-Insensitive Fiber Four-Wave Mixer", ECOC '87, Sep. 20-24, 1998, Madrid, Spain, pp. 85, 87.

Mollenauer et al., "Method for facile and accurate measurement of optical fiber dispersion maps", Optics Letters / vol. 21, No. 21 / Nov. 1, 1996, pp. 1724-1726.

Inoue "Four-Wave Mixing in an Optical Fiber in the Zero-Dispersion Wavelength Region", Journal of Lightwave Technology, vol. 10, No. 11, Nov. 1992, pp. 1553-1561.

* cited by examiner

METHOD OF MAKING OPTICAL FIBER AND OPTICAL FIBER MADE BY THE METHOD

BACKGROUND OF THE INVENTION

1. Field of the Invention

The present invention relates to a method of manufacturing an optical fiber preform having at least a core portion, and to an optical fiber produced by drawing the optical fiber preform.

2. Description of the Background Art

Generally, an optical fiber is manufactured by drawing an optical fiber preform. The optical fiber preform is produced by an outside vapor deposition method (OVD method), modified chemical vapor deposition method (MCVD method), vapor-phase axial deposition method (VAD method), or rod-in-collapse method, etc. Of various kinds of optical fibers, the tolerance of profile shape parameters required to achieve desired characteristics is narrow in optical fibers such as a dispersion-shifted fiber, dispersion flattened fiber, dispersion compensating fiber, and highly nonlinear dispersion-shifted fiber (including highly nonlinear dispersion flattened fiber), etc. It is difficult to produce these optical fibers in a manner such that the profile shape parameters are in a desirable range throughout over a long length and the optical characteristics are desirable throughout over a long length.

Japanese Patent Application Publication No. 2002-293563, Japanese Patent Application Publication No. 2003-40636, and Japanese Patent Application Publication No. 2003-20239 respectively disclose techniques with which an attempt is made to solve the above-mentioned problems by grinding the outer periphery of, or by providing a cladding material to, an optical fiber preform or an intermediate preform (semi-manufactured product at an intermediate stage of manufacturing an optical fiber preform). However, there are cases in which these techniques are insufficient for solving the problems, since in the case of the above-mentioned optical fibers, an error in the measured values of the core portion diameter and the refractive index occasionally increases. For example, in the above-mentioned optical fibers, the diameter of a core portion is as small as 10 µm or less, and also the diameter of a region which is to become the core portion is often small at the stage immediately before fiber drawing of an optical fiber preform, whereby correct measurement of shape of the core portion is difficult. Likewise, the relative refractive index difference $\Delta$ of the core portion is often as high as 1% or more relative to the cladding portion, and it is difficult to measure a refractive index profile correctly. Furthermore, there are cases in which the outer diameter of a preform which is determined based on the result of such measurement significantly differs from the true target outer diameter, thereby causing a wide variation in the optical characteristics of an optical fiber produced from the preform by fiber-drawing.

Various applications such as wavelength conversion, optical amplification, pulse compression, an optical switch, generation of supercontinuum light (white light), a multi-wavelength light source, chirp compensation of a light source, etc. have been investigated and developed by using the generation of optical nonlinear effects in a highly non-linear dispersion-shifted fiber, such as four-wave mixing (FWM), self-phase modulation (SPM), cross-phase modulation (XPM), and modulation instability. Particularly, in a case where wavelength conversion or optical parametric amplification (OPA) is implemented, the variation of chromatic dispersion and the variation of zero dispersion wavelength are matters of significant concern (See, for example, A. Legrand, et al., Technical Digest OAA2003, WD2, p. 261; or A. Mussot, et al., ECOC2004 Proceedings Vol. 2, Paper Tu3.3.7, p. 190).

The invention disclosed in Japanese Patent Application Publication No. 2000-347228 aims to suppress the fluctuation of chromatic dispersion by making the length of an optical fiber to be shorter. However, the efficiency in the generation of nonlinearity is better in an optical fiber having a longer length to some extent. In Japanese Patent Application Publication No. 2004-29441, it is claimed that the variation in the chromatic dispersion is preferably 3 ps/nm/km or less. Even in such case, when the dispersion slope is assumed to be +0.02 ps/nm²/km or so, the variation in the zero dispersion wavelength reaches 150 nm. In S. Watanabe, et al., ECOC'98, PD-Paper p. 85, the broad band wavelength conversion is achieved using a polarization-maintaining highly nonlinear dispersion shifted fiber in which the variation of zero dispersion wavelength is within ±0.5 nm over a fiber length of 1000 m. It is expected to increase the bandwidth by further decreasing the variation.

SUMMARY OF THE INVENTION

An object of the present invention is to provide a method of manufacturing an optical fiber preform from which an optical fiber having desired characteristics can easily be produced.

In order to achieve the object, a method of manufacturing an optical fiber preform having at least a core portion comprises the steps of:

(1) preparing an intermediate preform for manufacturing an optical fiber preform;

(2) measuring a refractive index profile in a radial direction at each of a plurality of positions in the longitudinal direction of the intermediate preform;

(3) demarcating the outer diameter shape of the intermediate preform based on the result of the step of measuring the refractive index profile so that an optical fiber preform can be manufactured such that an optical fiber having target characteristics is to be produced from the optical fiber preform;

(4) grinding the outer periphery of the intermediate preform so that the outer diameter shape may be formed as demarcated in the step of demarcating the outer diameter shape; and (5) elongating, so as to have a substantially constant outer diameter, the intermediate preform which has been subjected to the grinding step.

Another aspect of the present invention is to provide a method of manufacturing an optical fiber by fiber-drawing an optical fiber preform manufactured by the method of the present invention for manufacturing an optical fiber preform.

Yet another aspect of the present invention is to provide an optical fiber which is manufactured by an optical fiber manufacturing method of the present invention and which has an effective area of 12 µm² or less at the 1550 nm wavelength, a zero dispersion wavelength of 1470 nm to 1630 nm, and dispersion variations within ±0.02 ps/nm/km over a length of 1000 m. Or, provided is an optical fiber manufactured by an optical fiber manufacturing method of the present invention, which has a chromatic dispersion of −150 ps/nm/km or less at the 1550 nm wavelength, and in which a ratio ($D/D_{mean}$) of a chromatic dispersion D at an arbitrarily selected position in the longitudinal direction over a length of 10,000 m to a chromatic dispersion average $D_{mean}$ in the full length is in the range of 0.8 to 1.2.

DESCRIPTION OF PREFERRED EMBODIMENTS

Figure 1:
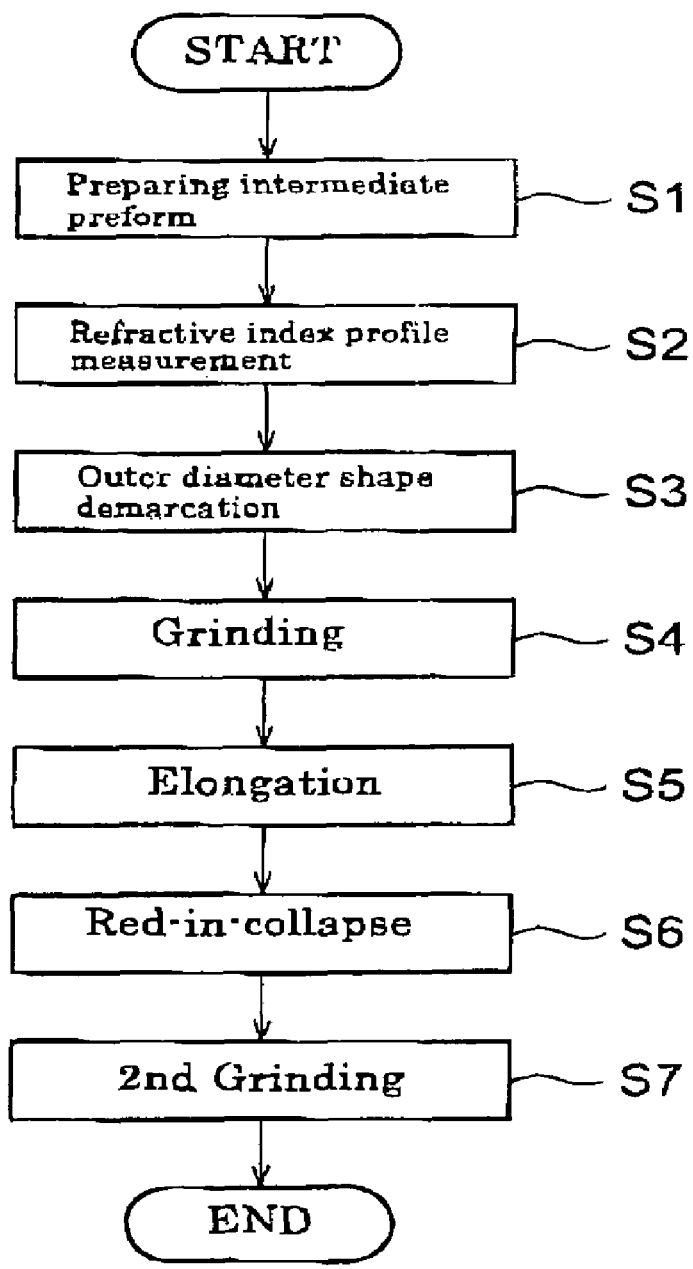
FIG. 1 is a flow chart showing the steps of manufacturing an optical fiber preform according to an embodiment of the present invention.

Hereinafter, referring to the accompanying drawings, preferred embodiments for implementing the present invention will be described in detail. The drawings, which are provided for the purpose of explaining embodiments, should not be interpreted to limit the scope of the invention. The dimensional relationship in the drawings does not always coincide with the actual one. In the explanation of the drawings, an identical mark is put on the same element, and a repetition of explanation will be omitted.

Figure 2:
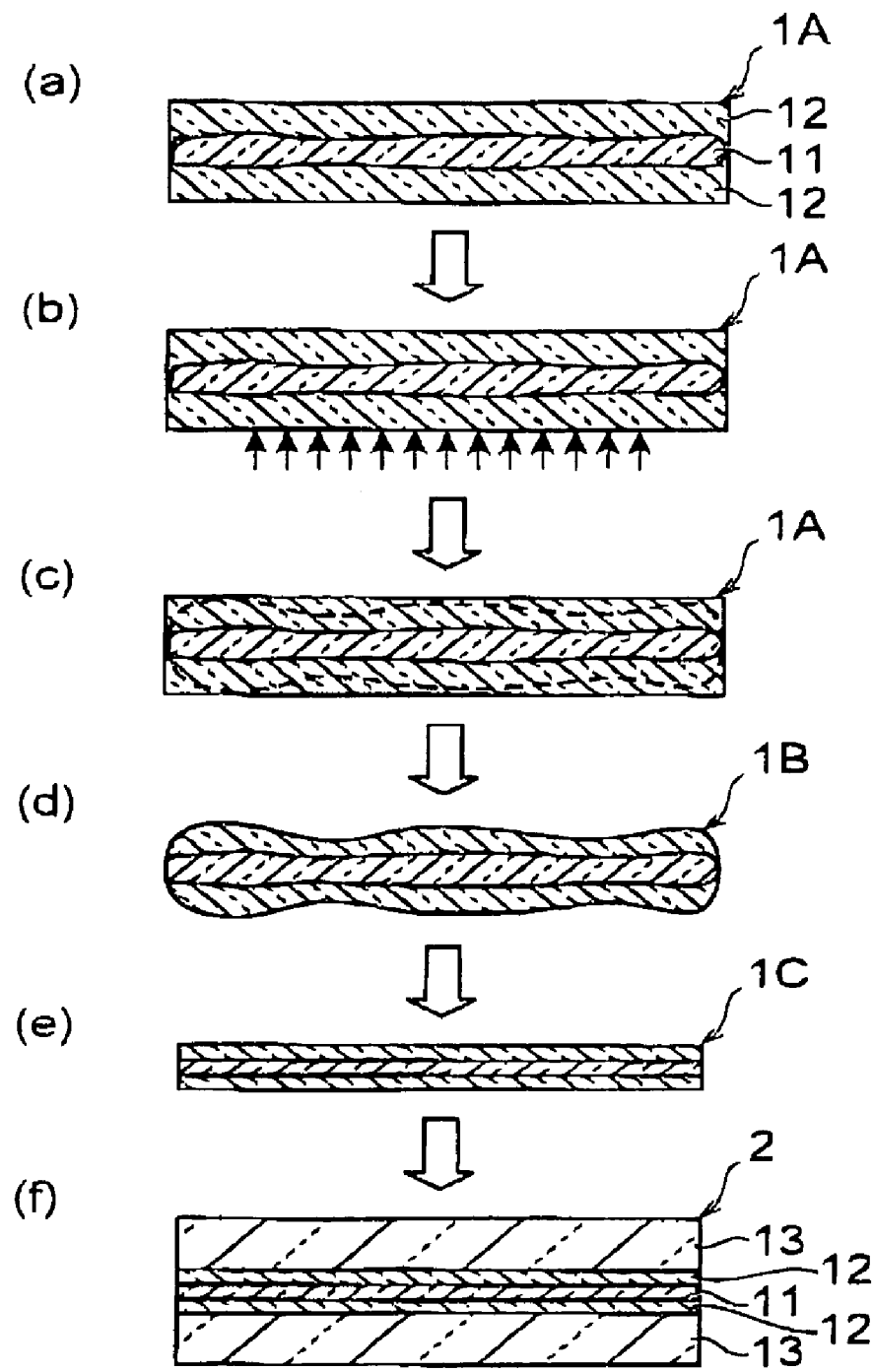
FIG. 2, including (a) to (f), is a schematic diagram showing an optical fiber preform or an intermediate preform at a manufacturing step according to the embodiment.

FIG. 1 is a flow chart showing the steps of manufacturing an optical fiber preform according to an embodiment of the present invention. FIG. 2 is a schematic diagram showing an optical fiber preform or an intermediate preform at a manufacturing step according to the embodiment. FIG. 2 illustrates cross-sections including a center axis of intermediate preforms 1A-1C and an optical fiber preform 2 which have a substantially columnar shape.

First, an intermediate preform 1A is prepared in a step of preparing intermediate preform (S1) (FIG. 2 (a)). The intermediate preform prepared 1A in Step S1, which has a core portion 11 and a cladding portion 12, is manufactured, for example, by inserting a glass rod made of $GeO_2$-doped silica glass and having a highly circular cross-section into a glass pipe made of fluorine-doped silica glass and collapsing that they are consolidated. Or, the intermediate preform 1A may be prepared by the OVD method or the MCVD method. The cladding portion 12 has a sufficient margin for grinding because the outer peripheral part of the intermediate preform 1A is subjected to grinding as described later.

Next, in a step of refractive index profile measurement (S2), refractive index profiles in the radial direction of intermediate preform are measured at a plurality of positions along the longitudinal direction of the intermediate preform 1A (FIG. 2 (b)). Here, the positions where such measurement is performed are positions which will make an interval between two adjacent positions to be 1 km or more in terms of the converted length of an optical fiber to be manufactured as a final product from the intermediate preform. In this measurement, non-destructive measurement equipment, such as a preform analyzer, for measuring a refractive index profile is used. Thus, the shapes of refractive index profiles within cross-sections at a plurality of positions along the longitudinal direction of the intermediate preform 1A are obtained.

Subsequently, in the step of outer diameter shape demarcation (S3), the outer diameter shape of the intermediate preform is demarcated based on the result of refractive index profile measurement (S2) so that an optical fiber preform may be manufactured such that an optical fiber having target characteristics can be produced from the optical fiber preform (FIG. 2 (c)). In FIG. 2 (c), the demarcated outer diameter shape is shown by a broken line. In such case, the characteristics (e.g., chromatic dispersion and dispersion slope, etc.) that the optical fiber may have upon fiber drawing are forecast, for example, by the finite element method, based on the results of refractive index profile measurement at a plurality of positions along the longitudinal direction of the intermediate preform 1A. When the forecast characteristics thus obtained differ from the target characteristics, the outer diameter of the core portion 11 and the cladding portion 12 that the intermediate preform 1A should have at the respective positions are demarcated so as to compensate the differences. For the purpose of such demarcation, a computer which is equipped with software suitable for such processing can preferably be used. Thus, the shape of the cladding portion 12 of the intermediate preform 1A is demarcated to the outer diameter shape that it should have, and also the part and the volume of grinding are determined.

The following is more specific description about the step of demarcation of outer diameter shapes (S3). For example, diameters 2a that the core portions of an optical fiber after fiber drawing should have at the respective positions in the longitudinal direction thereof, corresponding to the positions in the longitudinal direction of the intermediate preform are calculated in the following manners: in the case of a non-zero dispersion shifted fiber, so as to make the chromatic dispersion to become a desired value; in the case of a dispersion-shifted fiber and a highly nonlinear dispersion-shifted fiber, so as to make the zero dispersion wavelength to become a desired value; and in the case of a dispersion compensating fiber, so as to make the ratio of the dispersion slope and the chromatic dispersion to become a desired value. The diameters 2a of the core portions of the optical fiber after fiber drawing may be calculated such that the other characteristics such as cutoff wavelength, mode field diameter, effective area, etc. become desired values.

Then, outer diameters 2B at the respective positions along the longitudinal direction of the intermediate preform 1A are demarcated (calculated) according to formula (1):

$$2B = C \times 2A/2a \quad (1),$$

on the basis of the calculated diameters 2a of the core portions of the optical fiber and the measured diameters 2A of the core portions 11 at the respective positions along the longitudinal direction of the intermediate preform 1A. Here, C is a coefficient, which is a value determined with respect to each intermediate preform 1A. In this manner, the shape of an outer diameter of the intermediate preform 1A is demarcated so as to become the shape of outer diameter that the optical fiber preform or the intermediate preform should have, and the position and the volume of grinding to be done is determined. The outer diameter of the intermediate preform may be demarcated such that the ratio of the diameter of the core portion measured in the step of measuring a refractive index profile and the outer diameter of an optical fiber preform becomes constant in the longitudinal direction.

After the above-described procedures, in the grinding step (S4), the outer periphery of the intermediate preform is ground to have an outer diameter shape as demarcated in the outer diameter shape demarcation step (S3), and thereby an intermediate preform 1B after grinding is made (FIG. 2 (d)). More specifically, the procedures are as follows. The intermediate preform is placed on a predetermined position of a numerically controlled lathe. Then, the results of calculation in the outer diameter shape demarcation step (S3) are input to the control unit of the lathe through an input device after being processed according to the data form of the input device of the lathe.

In this case, the number of data which is input is the number of positions which is equivalent to one position per 1 km or more, for example, in terms of the converted length of optical fiber. Preferably, the lathe has a means with which the shape of a cladding portion in intermediate regions among a plurality of positions is determined by fitting through a linear interpolation or a given function based on the shape of the cladding portion which has been demarcated at the plurality of positions. If such means is used, the shape that the cladding portion should have in the respective intermediate regions between the measurement positions can be calculated and the volume of grinding can be adjusted more suitably based on such calculation. Also, the number of the measurement positions can be decreased, and accordingly the time needed for manufacture can be reduced. The computer used in the outer diameter shape demarcation step (S3) may be used for the purpose of demarcation using such an interpolation or fitting with respect to the shape of cladding portions in the intermediate regions among the plurality of positions.

After the completion of preparation such as input of data, the outer peripheral part of the intermediate preform is subjected to grinding using a numerically controlled lathe, and an intermediate article 1B after grinding is produced. In this grinding, control is made by the control unit of the numerically controlled lathe according to the input data regarding the movement of the grinding blade and the number of rotations of the intermediate preform such that only a part which should be ground is ground.

In the grinding step (S4), the outer periphery of the intermediate preform is ground, not by cylindrical grinding, for example, in a manner such that the diameter becomes uniform along the longitudinal direction, but in a manner such that the outer peripheral diameter of the intermediate preform is varied longitudinally according to the demarcated outer diameter.

If the positions that have been measured in the refractive index profile measurement step (S2) and where the outer diameters have been demarcated in the outer diameter shape demarcation step (S3) do not coincide exactly with the positions in the grinding step, it is impossible to obtain an optical fiber preform in which the variation in the estimated characteristics is small. Therefore, it is advisable to mark, in the refractive index profile measurement step (S2), a standard position for the grinding step (S4) by putting a mark to the standard position with an oil pen or by means of bruising.

A preform analyzer generally has a reading accuracy of about ±0.01 mm. Therefore, as the diameter 2r of the core portion of the intermediate preform 1A increases, the reading error relatively decreases. When a reading error of ±0.01 mm exists, a relative error of ±0.01/2r occurs as a result of the measurement.

Also, the processing precision in the grinding is about ±0.02 mm in the case of a numerically controlled lathe for grinding glass. In other words, as the outer diameter $2B_2$ of the intermediate preform at the grinding step (S4) increases, the processing error in the grinding relatively decreases. When the processing error of ±0.02 mm exists, a relative error of ±0.02/$2B_2$ occurs as a result of the processing.

The error of measurement and the error of processing are independent respectively, and therefore the expected error is a root-sum-square value. That is, the following error occurs:

$$Er = \pm\{0.0001/(2r)^2 + 0.0004/(2B_2)^2\}^{1/2}$$

The relative error Er may be preferably ±0.5% or less, more preferably ±0.3% or less, and most preferably ±0.1% or less.

For example, in the case where the outer diameter of the intermediate preform is 10 mm, the core portion diameter of 2.2 mm or more is preferable because Er becomes equal to or less than ±0.5%, and more preferably, the core portion diameter is 4.5 mm or more because Er becomes equal to or less than ±0.3%. In this case, the absolute value of the relative error Er cannot become equal to or less than 0.1 mm$^{-1}$. When the outer diameter of the intermediate preform is 20 mm, the diameter of the core portion is preferably 2.1 mm or more because Er becomes equal to or less than ±0.5%, and more preferably the diameter of the core portion is 3.6 mm or more because Er becomes equal to or less than ±0.3%. In this case, the absolute value of the relative error Er cannot become equal to or less than 0.5 mm$^{-1}$.

When the outer diameter of the intermediate preform is 30 mm, the diameter of the core portion is preferably 2.1 mm or more because Er becomes equal to or less than ±0.5%, more preferably the diameter of the core portion is 3.5 mm or more because Er becomes equal to or less than ±0.3%, and most preferably the diameter of the core portion is 13.5 mm or more because Er becomes equal to or less than ±0.1%. When the outer diameter of the intermediate preform is 40 mm, the diameter of the core portion is preferably 2.1 mm or more because Er becomes equal to or less than ±0.5%, more preferably the diameter of the core portion is 3.4 mm or more because Er becomes equal to or less than ±0.3%, and most preferably, the diameter of the core portion is 11.6 mm or more because Er becomes equal to or less than ±0.1%.

It is more preferable that both the diameter of the core portion and the diameter of the intermediate preform be greater. Particularly, the diameter of the core portion should be 2.1 mm or more, and more preferably 3.4 mm or more. It is most preferable if the precision in the measurement and the grinding improve and the error decreases, because the relative error reduces accordingly.

Subsequently, in the elongation step (S5), the intermediate preform 1B is elongated so as to have a substantially constant outer diameter (to the extent that the variation of the outer diameter in the portion that is to be finally processed into an optical fiber (i.e., effective portion) is within about ±0.5%) so that an intermediate preform 1C is produced (FIG. 2 (e)). Since the grinding is performed in the grinding step such that 2B/2A or 2B/2A×2a becomes constant, by simply providing, on the periphery of the intermediate preform 1C, a uniform thickness of glass material having a constant refractive index profile in the longitudinal direction, it is possible to easily manufacture an optical fiber preform from which an optical fiber having a small variation in the characteristics can be produced.

The outer diameter of the intermediate preform 1C is 8 mm or more, preferably 12 mm or more, and more preferably 15 mm or more. This is because the larger the outer diameter of the intermediate preform, the more the relative error decreases, since the variation of the outer diameter of the intermediate preform is about ±0.04 mm if a general technology is used. When the outer diameter is 8 mm, the relative error becomes ±0.50%; when the outer diameter is 12 mm, the relative error becomes ±0.33%; and when the outer diameter is 16 mm, the relative error becomes ±0.25%. As a result, the variation of the diameter of the core portion in the longitudinal direction of the intermediate preform or the optical fiber preform decreases, and accordingly the variation in the characteristics is small when an optical fiber is made from the optical fiber preform by drawing.

The heat source used for the elongation is, for example, an oxyhydrogen flame. It is more preferable to use an electric furnace (an induction furnace or resistance furnace), an oxygen-containing heat plasma burner, or a $CO_2$ laser. This is because the desired shape of the intermediate preform obtained in the grinding step may be changed due to erosion caused on the glass surface by the hydrogen and the moisture which are generated in a large amount if the oxyhydrogen flame is used.

The elongation step (S5) preferably includes at least once a provisional elongation process for making a diameter greater than the desired diameter. A high-precision elongation is made possible by including such a provisional elongation process at least once, and the variation of the outer diameter of the intermediate preform can further be decreased. The provisional elongation may be implemented a plurality of times. The outer diameter 2F of the intermediate preform after provisional elongation may be a diameter that satisfies the following formula (2):

$$0.9 \times 2D < 2F < 2E/0.9 \quad (2)$$

where 2D is an outer diameter of the intermediate preform before the elongation step, and 2E is a target outer diameter of the intermediate preform to be obtained in the elongation step.

The following is an example of the effect of the provisional elongation, in which an intermediate preform having an outer diameter of about 40 mm after the grinding step (S4), the outer diameter exhibiting a longitudinal variation of ±1 mm, is elongated so as to have an outer diameter of 15 mm in the elongation step (S5). In the case where no provisional elongation was implemented, the outer diameter of the intermediate preform after the elongation step (S5) was 15.1±0.2 mm, the variation rate being 1.3%. In contrast, when a provisional elongation was implemented so as to have an outer diameter of 25 mm and thereafter an elongation was performed aiming at an outer diameter of 15 mm, the outer diameter of the intermediate preform was 15.05±0.02 mm, the variation rate being 0.13% after the elongation step (S5). Thus, by adding a provisional elongation step, the shape of the intermediate preform in the longitudinal direction after elongation can be made stable.

Subsequently, in the rod-in-collapse step (S6), the intermediate preform is inserted into a glass pipe 13 and collapsed such that the intermediate preform 1C and the glass pipe 13 are consolidated so that an optical fiber preform 2 or a further intermediate preform are formed (FIG. 2 (f)). In the case of the optical fiber preform 2, the glass pipe 13 is to become a physical cladding region in an optical fiber after fiber drawing.

The portion that is to become a physical cladding region can also be made generally by accumulating and vitrifying a glass material around the intermediate preform 1C through a soot process such as the VAD method or the OVD method. In this case, the effect of elongation for obtaining a uniform diameter decreases because the outer diameter of an optical fiber preform 2 to be produced and the diameter of the intermediate preform 1C including a core portion vary in the longitudinal direction due to contraction of soot during sintering. Also, the outer diameter of the optical fiber preform 2 to be manufactured varies due to variation of the accumulated amount of soot in the longitudinal direction. In contrast, when a glass material is provided around the intermediate preform 1C in the rod-in-collapse step, the ratio between the outer diameter of the optical fiber preform 2 and the diameter 2A of the core portion is maintained constant because the shape of the intermediate preform 1C including the core portion hardly changes.

Next, Example 1 and Example 2 of the optical fiber preform manufacturing method according to embodiments of the present invention will be explained. In Example 1, an intermediate optical fiber preform was prepared by processing a glass rod so as to have an outer diameter of 24 mm in the grinding step and the elongation step and then grinding the outer periphery thereof so as to have a uniform outer diameter of 20 mmφ with a cylindrical grinder. A silica glass pipe having an outer diameter of 120 mmφ, an inner diameter of 20 mmφ, and a length of 650 mm was prepared, and an optical fiber preform was produced by performing the rod-in-collapse method, using the previously prepared intermediate preform as a rod. As a result of inspecting the optical fiber preform, diameters $2B_1$ of the intermediate preform, outer diameters $2D_1$ of the preform, ratios $2D_1/2B_1$, and the variations of ratios $2D_1/2B_1$ in the respective longitudinal positions of the optical fiber preform were as shown in Table I.

TABLE I

| Longitudinal positions mm | $2B_1$ mm | $2D_1$ mm | $2D_1/2B_1$ | Variations of $2D_1/2B_1$ % |
| --- | --- | --- | --- | --- |
| 40 | 20.03 | 117.99 | 5.891 | −0.26 |
| 80 | 19.96 | 118.01 | 5.911 | 0.09 |
| 120 | 20.01 | 118.06 | 5.899 | −0.12 |
| 160 | 20.03 | 118.11 | 5.897 | −0.16 |
| 200 | 20.01 | 118.09 | 5.901 | −0.09 |
| 240 | 19.98 | 118.11 | 5.911 | 0.09 |
| 280 | 19.96 | 118.09 | 5.915 | 0.16 |
| 320 | 20.01 | 118.13 | 5.902 | −0.06 |

TABLE I-continued

| Longitudinal positions mm | $2B_1$ mm | $2D_1$ mm | $2D_1/2B_1$ | Variations of $2D_1/2B_1$ % |
|---|---|---|---|---|
| 260 | 20.00 | 118.13 | 5.907 | 0.02 |
| 400 | 20.01 | 118.14 | 5.903 | −0.05 |
| 440 | 20.03 | 118.14 | 5.898 | −0.13 |
| 480 | 20.01 | 118.14 | 5.903 | −0.05 |
| 520 | 19.98 | 118.18 | 5.915 | 0.15 |
| 560 | 19.98 | 118.21 | 5.916 | 0.18 |
| 600 | 19.98 | 118.25 | 5.918 | 0.21 |

In the optical fiber preform, the variation of the diameter $2B_1$ of the region which was an intermediate preform is as small as ±0.04 mm, and also the variation of $2D_1/2B_1$ is as small as ±0.3%.

On the other hand, in Example 2, an intermediate optical fiber perform was processed through the grinding step and the elongation step so as to make the outer diameter 43 mmφ. Then, using the known VAD method, soot was deposited on the outside of the intermediate optical fiber preform, and it was vitrified into transparent glass by a known method so that an optical fiber preform was obtained. As a result of inspecting the optical fiber preform, the diameter $2B_1$ of the intermediate preform, the outer diameter $2D_2$ of the perform, the ratio $2D_2/2B_2$ and the variations of the ratios $2D_2/2B_2$ in the respective longitudinal positions of the optical fiber preform were as shown in Table II.

TABLE II

| Longitudinal positions mm | $2B_2$ mm | $2D_2$ mm | $2D_2/2B_2$ | Variations of $2D_2/2B_2$ % |
|---|---|---|---|---|
| 40 | 49.15 | 139.98 | 2.849 | 3.47 |
| 80 | 49.98 | 139.69 | 2.795 | 1.55 |
| 120 | 50.92 | 140.28 | 2.755 | 0.09 |
| 160 | 51.33 | 140.23 | 2.732 | −0.74 |
| 200 | 51.55 | 140.11 | 2.718 | −1.25 |
| 240 | 51.72 | 140.68 | 2.720 | −1.18 |
| 280 | 51.90 | 140.75 | 2.712 | −1.47 |
| 320 | 52.31 | 141.66 | 2.708 | −1.61 |
| 260 | 51.62 | 140.15 | 2.715 | −1.36 |
| 400 | 51.33 | 140.23 | 2.732 | −0.74 |
| 440 | 51.47 | 140.51 | 2.730 | −0.81 |
| 480 | 51.38 | 142.57 | 2.748 | −0.16 |
| 520 | 51.82 | 143.96 | 2.778 | 0.93 |
| 560 | 51.33 | 142.95 | 2.785 | 1.18 |
| 600 | 50.50 | 141.91 | 2.810 | 2.08 |

In this optical fiber preform, the variations of $2D_2/2B_2$ were ±0.5% or less at longitudinal positions of 160 mm-440 mm, which means that a uniform preform to that extent was obtained. However, in the longitudinal positions of 40 mm-120 mm and 480 mm-600 mm, which were the end portions of the preform, the variations of diameters $2B_2$ in the regions which were the intermediate preform were as large as ±1.2 mm, and also the variations of $2D_2/2B_2$ were as large as about ±3%.

Figure 3:
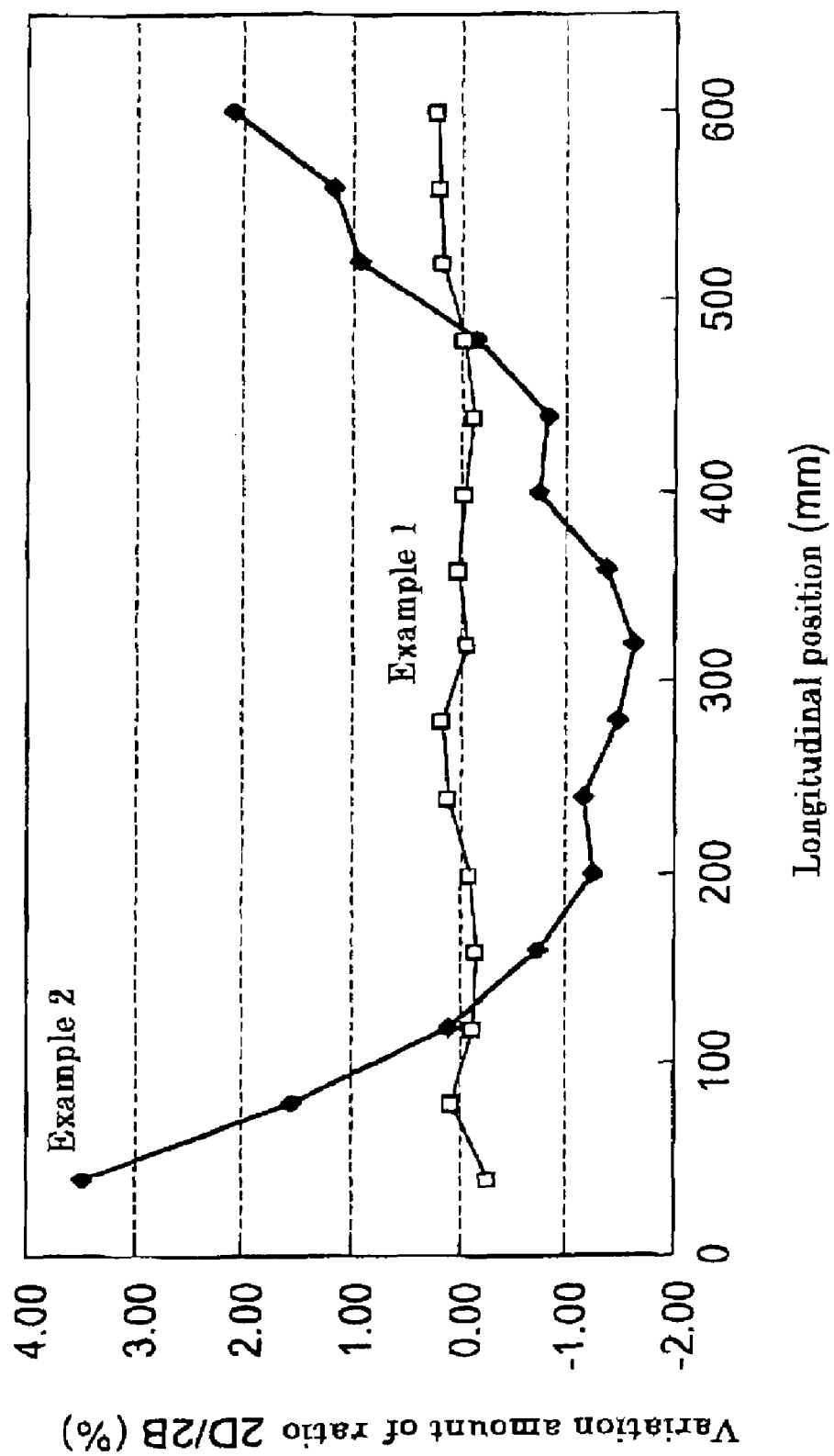
FIG. 3 is a graph plotting variation amounts of the ratios 2D/2B at positions in a longitudinal direction of the optical fiber preform in each of Examples 1 and 2.

FIG. 3 is a graph plotting variation amount of the ratios 2D/2B at the respective positions in the longitudinal direction of the optical fiber preforms in Examples 1 and 2.

By drawing the optical fiber preform 2 prepared as described above, an optical fiber having the desired characteristics can easily be manufactured. A further intermediate preform may be obtained in the rod-in-collapse step, and may be subjected to a second grinding step (S7). It is possible to obtain an optical fiber having more uniform desired characteristics along the longitudinal direction by drawing the optical fiber preform that has been ground in the second grinding step.

In the intermediate preform 1C, if the shape thereof and the amount of blowing-off glass from the glass surface are extremely uniform in the longitudinal direction, or if the refractive index profiles of the glass pipe are extremely uniform in the longitudinal direction, it is advisable to perform grinding, for example, by a cylindrical grinding method so as to have a uniform diameter in the second grinding step.

On the other hand, in a case where the amount of silica's blowing-off from the glass surface during elongation is substantially constant in the longitudinal direction but the diameter is not uniform in the longitudinal direction of the intermediate preform 1C, and the refractive index profiles of the glass pipe is substantially uniform in the longitudinal direction, it is advisable that the outer peripheral part of the intermediate preform obtained in the rod-in-collapse step be subjected to grinding in the second grinding step, for example, by means of a numerically controlled lathe or flame polishing (oxyhydrogen flame, oxygen/acetylene flame, heat plasma flame, etc.) so that the outer diameter of the intermediate preform after grinding may be equal to the product of a certain constant and the outer diameter of the elongated intermediate preform.

When the amount of silica's blowing-off from the glass surface is not uniform in the longitudinal direction of the intermediate preform 1C, or when the refractive index profiles of the glass pipe are not constant in the longitudinal direction, the intermediate preform obtained in the rod-in-collapse step may be subjected to the refractive index profile measurement step, the outer diameter shape demarcation step, and the grinding step (second grinding step) once again. Moreover, the intermediate preform obtained in the second grinding step may be elongated, the rod-in-collapse step may be done by preparing a glass pipe, and the outer periphery may be ground, more than once, respectively.

Next, the refractive index profile measurement step (S2) and the outer diameter shape demarcation step (S3) will be described in detail. When an optical fiber preform for a usual single mode fiber is manufactured, it is unnecessary to repeatedly measure the refractive index profile at an identical point in the refractive index profile measurement step. However, in the case of an optical fiber having a complicated structure or an optical fiber having a relative refractive index difference as high as about 1-5% at the core portion, such as a dispersion-shifted fiber, a dispersion compensating fiber, and a highly nonlinear fiber, it may be preferable to measure the refractive index profile of the identical point repeatedly.

Figure 4:
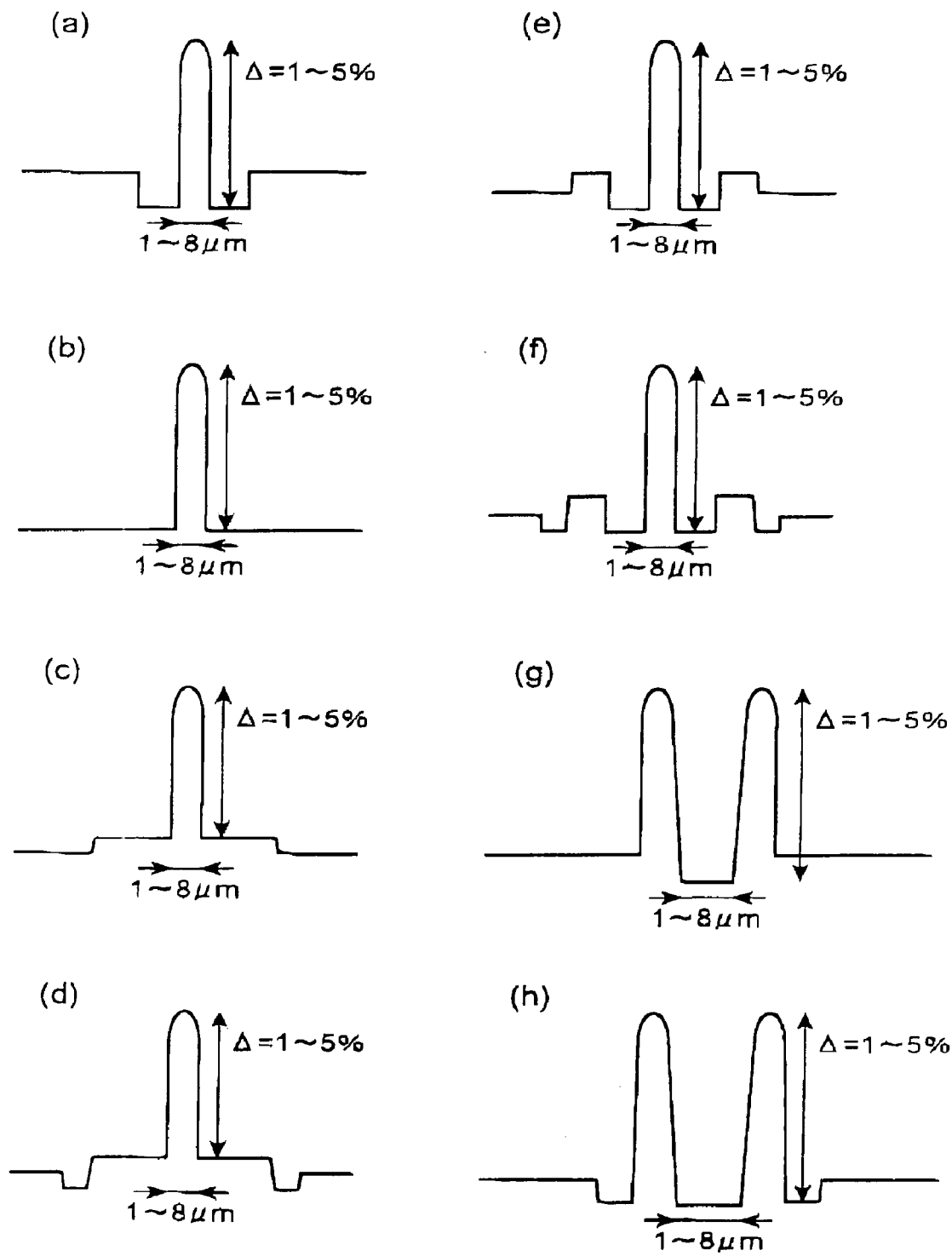
FIG. 4, including (a) to (h), illustrates examples of refractive index profiles of an optical fiber in which correct measurement may not be accomplished.

In the intermediate preforms or preforms for the above-mentioned optical fibers, there may be a case where the refractive index profile measurement cannot be implemented correctly because of the influence of the reflection at the interface due to the complicated structure, or the influence of periodic modulation of the refractive index profile (rhythmic fluctuation in refractive index) due to a high relative refractive index difference at the core portion. In addition, the error of radial measurement position (for example, a reading error at the core portion diameter) relatively increases since the core portion of the preform or the intermediate preform is small because the outer diameter of the core portion when drawn into an optical fiber is as small as 1-8 μm. FIG. 4 shows examples of refractive index profiles of optical fibers in which accomplishment of correct measurement is not always possible. In addition, there occurs an error with respect to the result of measurement of refractive index profiles because of a cause such as the shot noise of measurement (noise due to irregular fluctuation of electrons, etc.), the temperature fluctuation of measurement environment, vibration, or the adhesion of dust.

Figure 5:
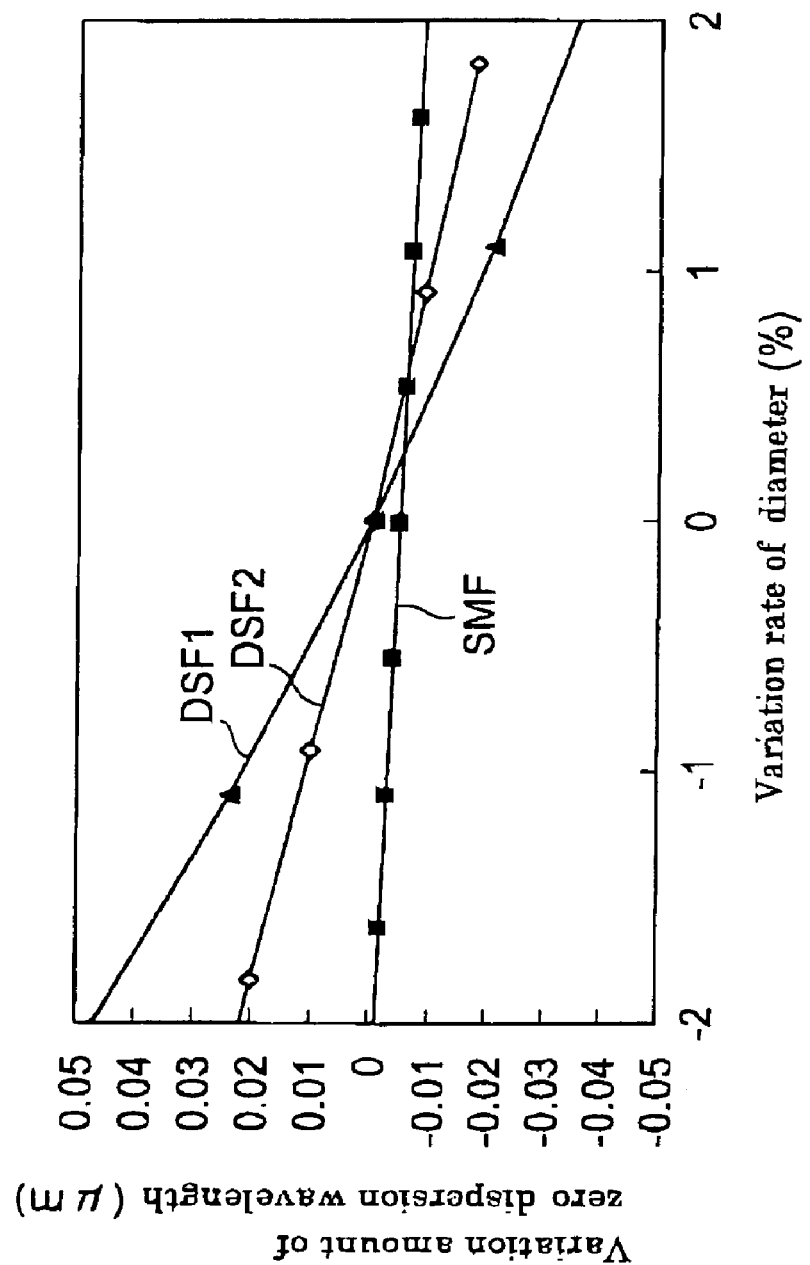
FIG. 5 is a graph showing relationships between the variation rate of core diameter and variation amount of zero dispersion wavelength.

FIG. 5 is a graph showing relationships between the variation rate of core diameter and the variation amount of zero dispersion wavelength, with respect to a dispersion-shifted fiber DSF1 having a relative refractive index difference of 3.0% at the central core, a zero dispersion wavelength of 1.5 µm, and a nonlinear coefficient γ of 20/W/km; dispersion-shifted fiber DSF2 having a relative refractive index difference of 1.0% at the central core, a zero dispersion wavelength of 1.5 µm, and a nonlinear coefficient γ of 4.8/W/km; and a single mode fiber SMF having a relative refractive index difference of 0.4% at the central core, a zero dispersion wavelength of 1.3 µm, and a nonlinear coefficient γ of 1.5/W/km. The values of the nonlinear coefficient γ of the respective optical fibers are those measured by the XPM method, and they will decrease to about 70 percent thereof if they are measured by the CW-SPM method.

As shown in FIG. 5, in the single mode fiber SMF (e.g., corresponding to ITU-T recommendation G-652 or G-654), the variation of the zero dispersion wavelength is 0.002 µm, hardly changing, when the core diameter varies 1%. On the other hand, in the dispersion-shifted fiber DSF2, the zero dispersion wavelength changes by 0.01 µm when the core diameter varies 1%, and in the dispersion-shifted fiber DSF1, the zero dispersion wavelength changes by 0.02 µm when the core diameter varies 1%. As compared with an ordinary single mode fiber, the dispersion-shifted fiber exhibits a variation which is larger on the order of 1 digit with the variation of the core diameter.

In the past, the refractive index profiles of an intermediate preform for manufacturing a dispersion-shifted fiber was measured using the same method as in the case of a single mode fiber, and therefore the precision of measurement was not good. Since the target transmission characteristics for an optical fiber produced from the intermediate preform were calculated by the finite element method or the like using such measurement result, the discrepancy between the designed and actual transmission characteristics of the optical fiber was great accordingly. This also applies in the case of other highly functional optical fibers such as the dispersion compensating fiber and the dispersion flattened fiber.

In order to solve this problem, it is preferable to perform the measurement of refractive index profiles a plurality of times at each of a plurality of positions along the longitudinal direction of the intermediate preform in the refractive index profile measurement step (S2); to determine, by statistical processing based on the results of the measurements thus performed plural times, the refractive index profiles at the respective positions in the outer diameter shape demarcation step (S3); and thereby to demarcate the outer diameter shape of the intermediate preform. Or, it is also preferable to calculate a plurality of the outer diameter shapes of the intermediate preform from the results of measurement of refractive index profiles performed plural times, and to demarcate the outer diameter shape of the intermediate preform by processing the outer diameter shapes statistically.

By performing such statistical processing, random errors can be decreased in the refractive index profile measurement and the result of measurement can be closer to an actual value. The term "statistical processing" as used herein includes the calculation of the average or the central value with respect to the results of the respective measurements conducted at a plurality of times at each of a plurality of measurement positions along the longitudinal direction; the equalization of outer diameters demarcated in a region along the longitudinal direction or fitting to a given function; and the interpolation of demarcated outer diameters to the regions other than the measurement positions according to the results of measurement in the longitudinal direction, etc.

Figure 6:
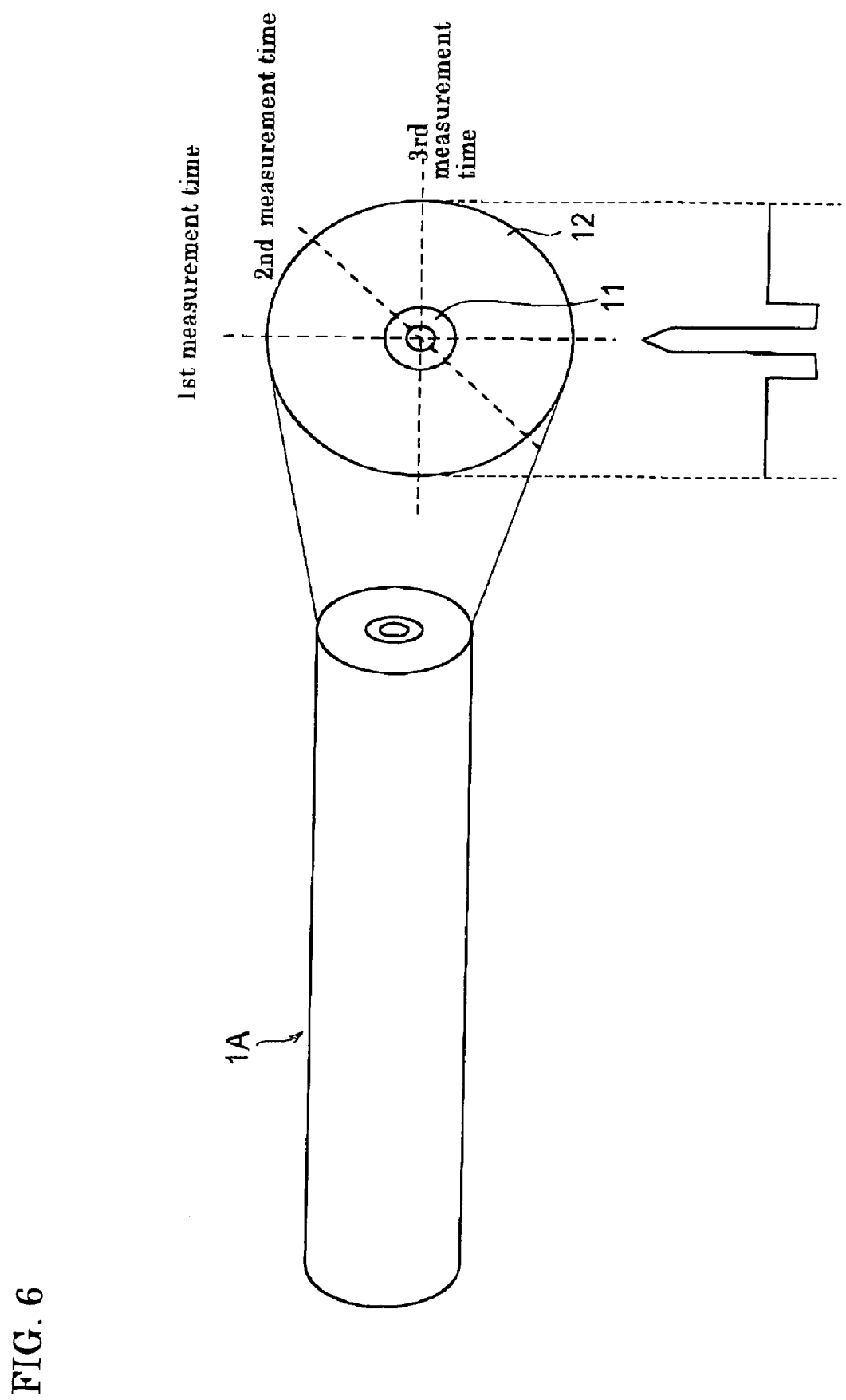
FIG. 6 is a schematic diagram illustrating the process of refractive index profile measurement.

The measurement of the refractive index profile is performed along an axial line in a radial direction which is orthogonal to the central axis of the intermediate preform. This axial line may be determined by turning for each measurement as shown in FIG. 6, although it may be a constant line for a plurality of measurements. Preferably, the measurements are conducted more than twice, and more preferably more than four times. When such measurement is performed four times or more, the statistical processing is possible using the results of other measurements, even if an extraordinary value is included.

Figure 7:
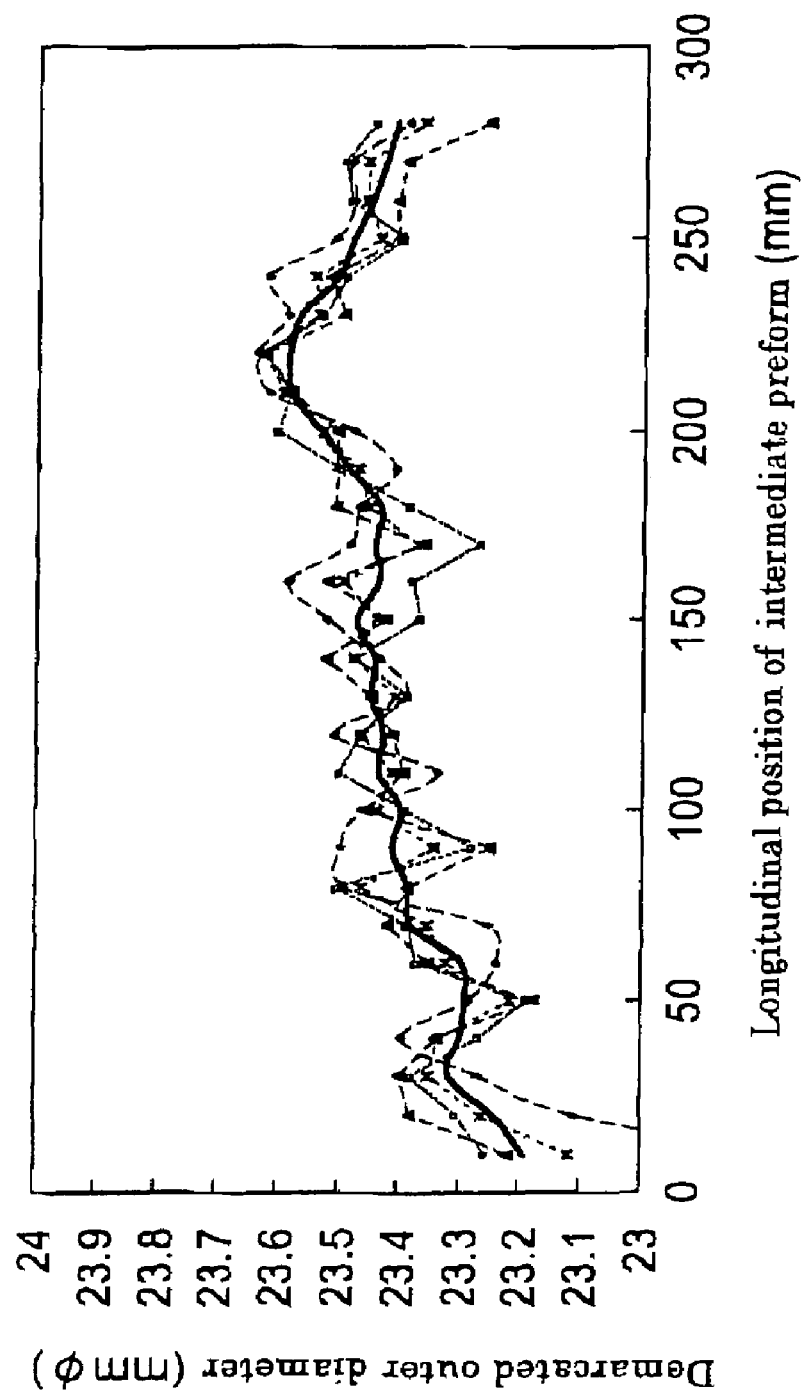
FIG. 7 is a graph showing the longitudinal distributions of demarcated outer diameters which were determined in an outer diameter shape demarcation step.
Figure 8:
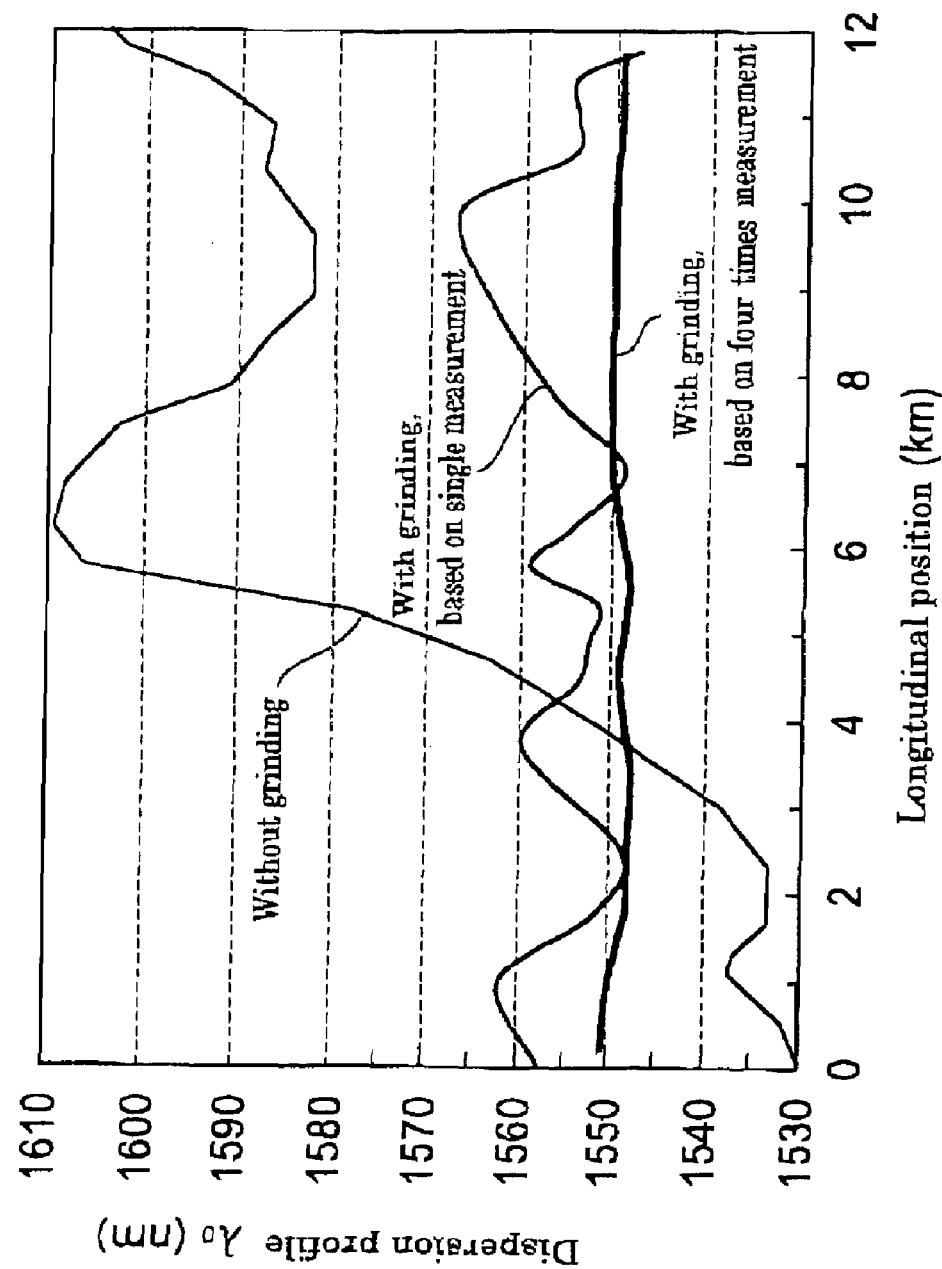
FIG. 8 is a graph showing longitudinal distributions of zero dispersion wavelength $\lambda_0$ of optical fibers.
Figure 9:
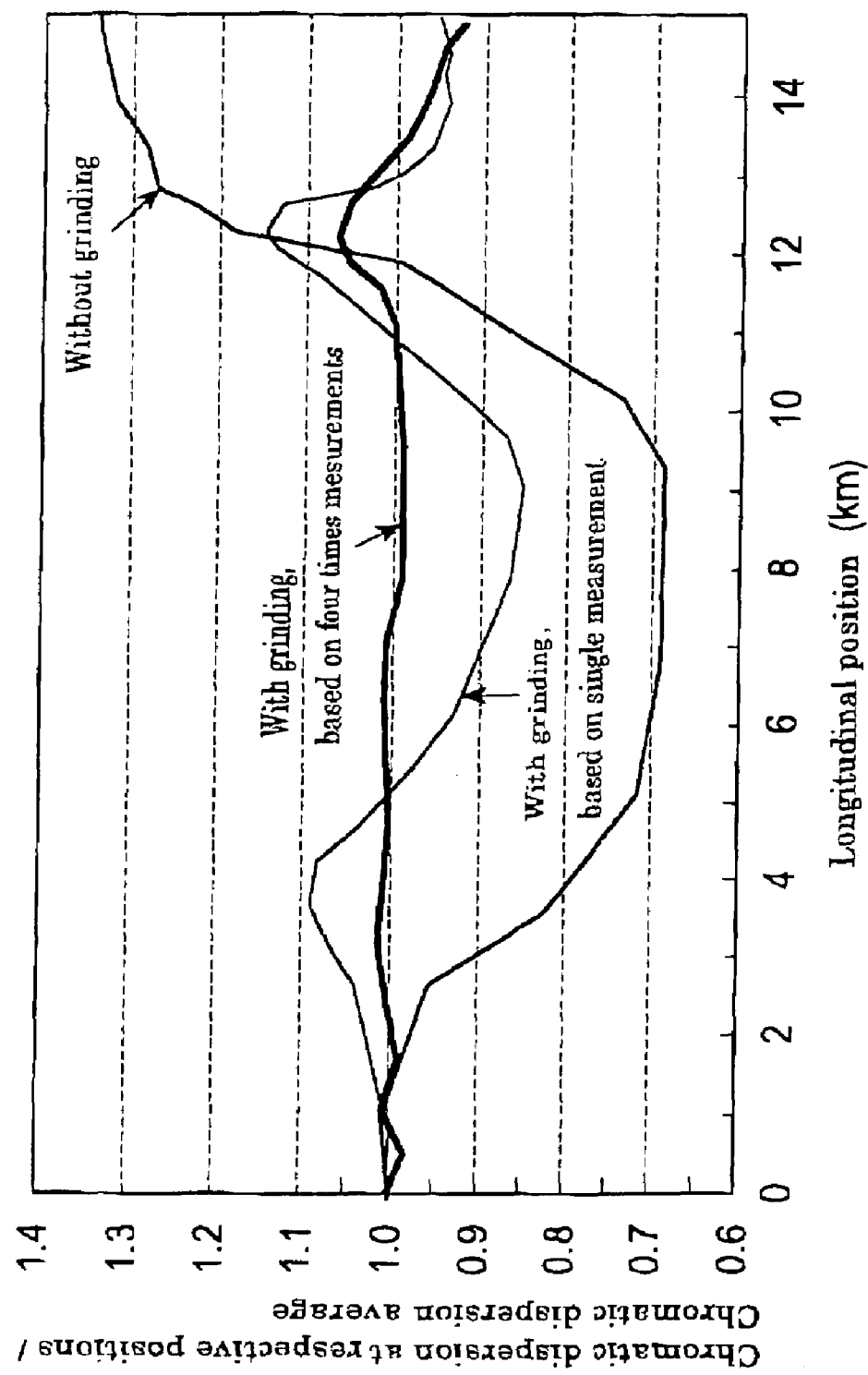
FIG. 9 is a graph showing distributions of ratios ($D/D_{mean}$) between a chromatic dispersion D at the respective positions in a longitudinal direction of optical fibers and an average value of chromatic dispersion Dmean in the full length.

FIG. 7 is a graph showing the longitudinal distributions of demarcated outer diameters which were determined in an outer diameter shape demarcation step. FIG. 8 is a graph showing longitudinal distributions of zero dispersion wavelength $\lambda_0$ of an optical fiber. FIG. 9 is a graph showing distributions of ratios ($D/D_{mean}$) between a chromatic dispersion D at the respective positions in a longitudinal direction of an optical fiber and an average value of chromatic dispersion Dmean in the full length.

The samples used here were intermediate preforms for highly nonlinear fibers each having a central core portion (the relative refractive index difference to the cladding portion: 2.9%), a depressed portion (the relative refractive index difference to the cladding portion: −0.3%), and a cladding portion. Each of the intermediate preforms was subjected to measurement of refractive index profiles four times at each of plural positions along the longitudinal direction thereof; the outer diameters thereof were demarcated using the finite element method and accordingly the grounding thereof was done so that the zero dispersion wavelength might become 1550 nm; and the fiber drawing was conducted to produce an optical fiber.

FIG. 7 shows the longitudinal distributions (the other four lines than the thick solid line) of the demarcated outer diameters based on the results obtained in each time of measurement of refractive index profiles, in addition to the longitudinal distribution (the thick solid line) of the demarcated outer diameters based on the average of the measurement results of the refractive index profiles, the measurement being performed four times. Also, FIGS. 8 and 9 respectively show the case where the grinding was conducted according to the longitudinal distribution of the demarcated outer diameters which was obtained based on the result of measuring the refractive index profiles once, and the case where the grinding of outer periphery was not performed, in addition to the case where the grinding was done according to the longitudinal distribution of the demarcated outer diameters which was obtained based on the average of the results of measuring the refractive index profiles four times.

Thus, the maximum variation of the demarcated outer diameter obtained from the result of each time measurement of the refractive index profiles is about 0.3 mm (1.3% with respect to the outer diameter). As compared with this, the variation of demarcated outer diameters obtained from the result of statistically processing the results of measuring the refractive index profiles four times is relatively smaller. Actually, a preform was made by performing the outer diameter demarcation of an intermediate preform using the results of statistically processing the results of four times measurements of refractive index profiles; grinding the outer periphery of the intermediate preform; elongating it so as to have a uniform diameter; and providing a cladding portion by the rod-in-collapse method. The longitudinal variation of the zero dispersion wavelength of the optical fiber produced by drawing the optical fiber preform thus obtained was ±2 nm per fiber length of 10 km, and the variation of the chromatic dispersion at the 1.55 μm wavelength was as small as ±0.06 ps/nm/km. In a range of the optical fiber exhibiting particularly excellent characteristics, the variation of zero dispersion wavelength was equal to or less than ±0.25 nm in a 1 km range of fiber length.

On the other hand, when the outer diameter demarcation was done using the results of one time measurement of the refractive index profiles, the longitudinal variation of zero dispersion wavelength of the optical fiber obtained by fiber drawing was ±10 nm per fiber length of 10 km, and the variation of the chromatic dispersion at the 1.55 μm wavelength was ±0.3 ps/nm/km. Although this was an improvement, exhibiting stability as compared with the conventional methods, the yield was not sufficient when extremely high precision was required. Moreover, when an optical fiber preform was made from the intermediate preform that had not subjected to the outer peripheral grinding, the longitudinal variation of the zero dispersion wavelength of the optical fiber obtained by drawing the optical fiber preform was ±40 nm per fiber length of 10 km, and the variation of the chromatic dispersion at the 1.55 μm wavelength was ±1.2 ps/nm/km, which was extremely large variation. As for the measurement of chromatic dispersion in the longitudinal direction of an optical fiber, see the description in L. F. Mollenauer, et al., Optics Letters, Vol. 21, p. 1724, for example.

As for the other characteristics, in the 1.55 μm wavelength, the dispersion slope was about +0.015 to +0.035 ps/nm$^2$/km; the effective area was about 9.0 to 12 μm$^2$; the mode field diameter was about 3.4 to 3.9 μm; the polarization mode dispersion was about 0.01 to 1.0 ps/m$^{1/2}$; the transmission loss was about 0.45 to 1.5 dB/km; and the cutoff wavelength was about 1.3 to 1.6 μm.

Next, methods of manufacturing an optical fiber and embodiments of the optical fiber according to the present invention will be described. The method of the present invention for manufacturing an optical fiber is such that an optical fiber is manufactured by drawing an optical fiber preform prepared according to an optical fiber preform manufacturing method of the present invention. Therefore, it is possible to produce an optical fiber exhibiting small variation of characteristics in the longitudinal direction. Particularly, the longitudinal variation in the moving average of outer diameters of the optical fiber at every 10 m fiber length may be equal to or less than ±0.5%, and preferably equal to or less than ±0.1%.

Also, an optical fiber according to the present invention is manufactured by an optical fiber manufacturing method of the present invention, and has an effective area of 12 μm$^2$ or less at the 1550 nm wavelength, a zero dispersion wavelength of 1470 nm or more and 1630 nm or less, and a dispersion variation within ±0.02 ps/nm/km in a range of 1000 m length. In this optical fiber, the absolute value of the dispersion slope may be 0.065 ps/nm$^2$/km or less at the 1550 nm wavelength. Also, the mode field diameter may be equal to or less than 3.9 μm.

For using a nonlinear phenomenon in the optical fiber, it is desirable for the effective area to be smaller because the nonlinear coefficient increases accordingly. However, since the core diameter also decreases accordingly, the manufacturing variation tends to increase. Particularly, when the effective area was 12 μm$^2$ or less, in a conventional manufacturing method, which did not depend on the manufacturing method of the present invention, it was difficult to manufacture an optical fiber preform or an optical fiber with high precision since the diameter of the core portion became about 4 μm or less.

In the case where a wavelength conversion is implemented using four-wave mixing which occurs in an optical fiber, the output power $P_I$ of the converted light is generally expressed by the following formulas (3) and (4):

$$P_1 = \gamma^2 P_P^2 P_S \exp(-\alpha L) L_{eff}^2 \eta \qquad (3)$$

$$\eta = \frac{1}{\alpha^2 + \Delta\beta^2}\left\{\alpha^2 + \frac{4\exp(-\alpha L)\sin^2(\Delta\beta L/2)}{L_{eff}^2}\right\} \qquad (4)$$

(See, for example, K. Inoue, J. Lightwave Techn., Vol. 10, p. 1553). Here, γ is a nonlinear coefficient of an optical fiber; L is the length of the optical fiber; $P_p$ is the incident power of pump light; Ps is the incident power of probe light; and α is the transmission loss of the optical fiber. $L_{eff}$, which is the effective length of the optical fiber, is expressed by the following formula (5):

$$L_{eff} = \{1 - \exp(-\alpha L)\}/\alpha \qquad (5)$$

Δβ is a parameter of phase mismatch and can be expressed roughly by the following formula (6):

$$\Delta\beta = -2\pi c \lambda_P^2 Disp\left(\frac{1}{\lambda_P} - \frac{1}{\lambda_s}\right)^2 \qquad (6)$$

where c is the speed of light in the vacuum; $\lambda_p$ is a pump light wavelength; $\lambda_s$ is a probe light wavelength; and Disp is the chromatic dispersion of the optical fiber at the pump light wavelength.

As can be seen from these formulas, the smaller the parameter of phase mismatch Δβ, the more preferable because the output power $P_I$ of the converted light increases accordingly. Ideally, if the value of the parameter of phase mismatch Δβ is 0, η becomes maximum 1. The value of parameter of phase mismatch Δβ becomes 0 when the value of the chromatic dispersion of the optical fiber at the pump light wavelength becomes 0, that is, pump light wavelength $\lambda_p$ and the zero dispersion wavelength of the optical fiber completely coincides with each other. Actually, however, it becomes difficult to make the pump light wavelength $\lambda_p$ and the zero dispersion wavelength of the optical fiber to completely coincide with each other because of the variation of zero dispersion wavelength in the longitudinal direction of the optical fiber.

Figure 10:
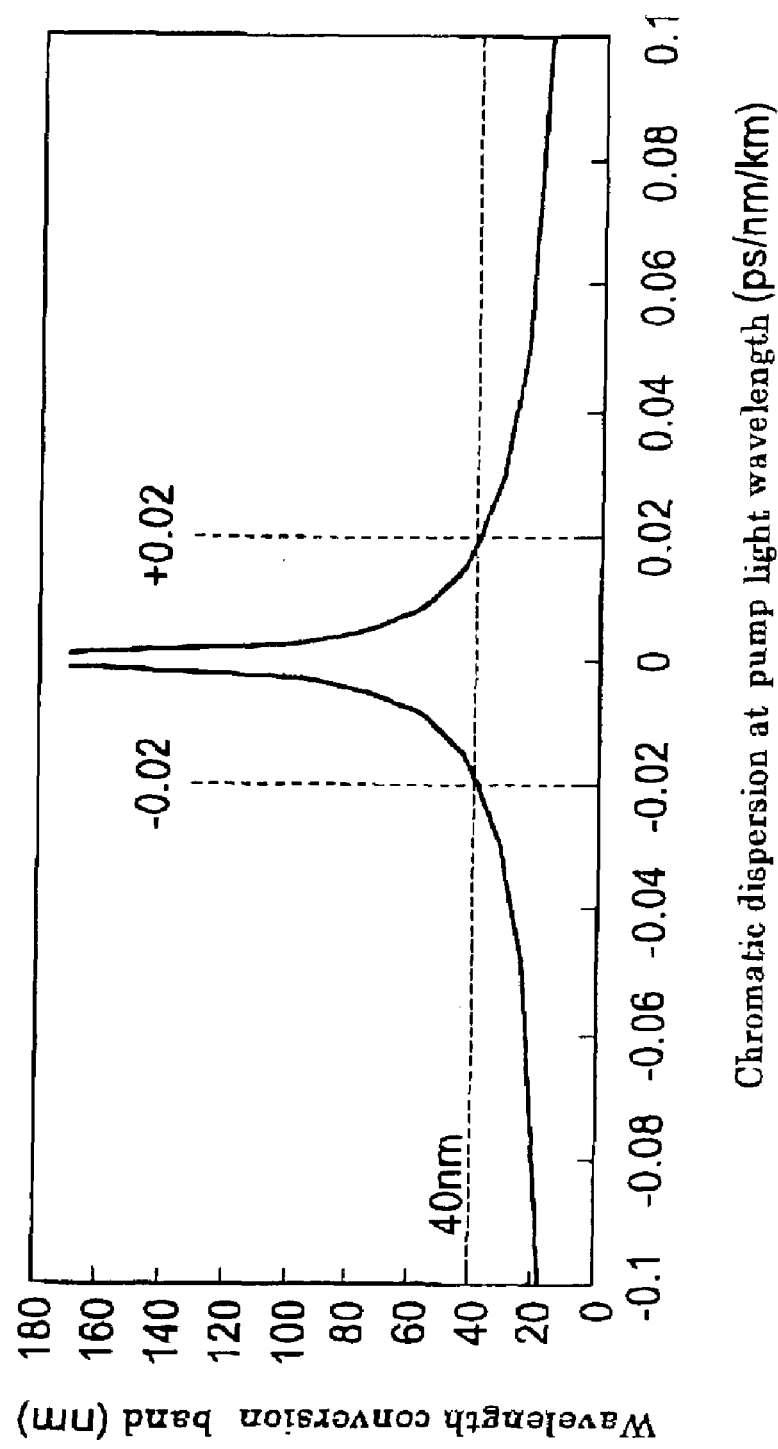
FIG. 10 is the graph showing a relationship between chromatic dispersion Disp of an optical fiber at a pump light wavelength and wavelength conversion bands.

FIG. 10 is a graph showing a relationship between the chromatic dispersions Disp of the optical fiber at the pump light wavelength and the wavelength conversion bands. The term "wavelength conversion band" as used herein means a value that is expressed by the difference of two wavelengths, $\lambda_{s2} - \lambda_{s1}$, where $\lambda_{s1}$ and $\lambda_{s2}$ (on the condition that $\lambda_{s1} < \lambda_p < \lambda_{s2}$) are the wavelengths of the probe light in the case in which the power of the converted light becomes half of the maximum power of the converted light that exists under the condition in which the probe light wavelength $\lambda_s$ is extremely close to the pump light wavelength $\lambda_p$ on the assumption that the incident power $P_s$ of the probe light and the incident power $P_p$ of the pump light are respectively constant. The length L of the optical fiber was 500 m, and the transmission loss α of the optical fiber was 1.5 dB/km. Preferably, the wavelength conversion band is equal to or more than 40 nm which can cover C-band or L band. In this case, the absolute value of chromatic dispersion Disp at the pump light wavelength must be 0.02 ps/nm/km or less as shown in FIG. 10.

The dispersion slope (Slope), which is the wavelength differential of the chromatic dispersion Disp, is expressed by the following formula (7), on the assumption that the Slope is constant regardless of the wavelength:

$$\text{Disp} = \text{Slope} \times (\lambda_p - \lambda_s) \quad (7)$$

Where $\lambda_z$ is the zero dispersion wavelength of the optical fiber. When the difference $\lambda_p - \lambda_z$ is constant, the smaller the dispersion slope (Slope), the more desirable because the absolute value of the chromatic dispersion Disp (i.e., absolute value of Δβ) decreases and η increases accordingly. Likewise, when the dispersion slope (Slope) is constant, the smaller the difference $\lambda_p - \lambda_z$, the more desirable because the absolute value (the absolute value of Δβ) of the chromatic dispersion Disp decreases and η increases accordingly.

Figure 11:
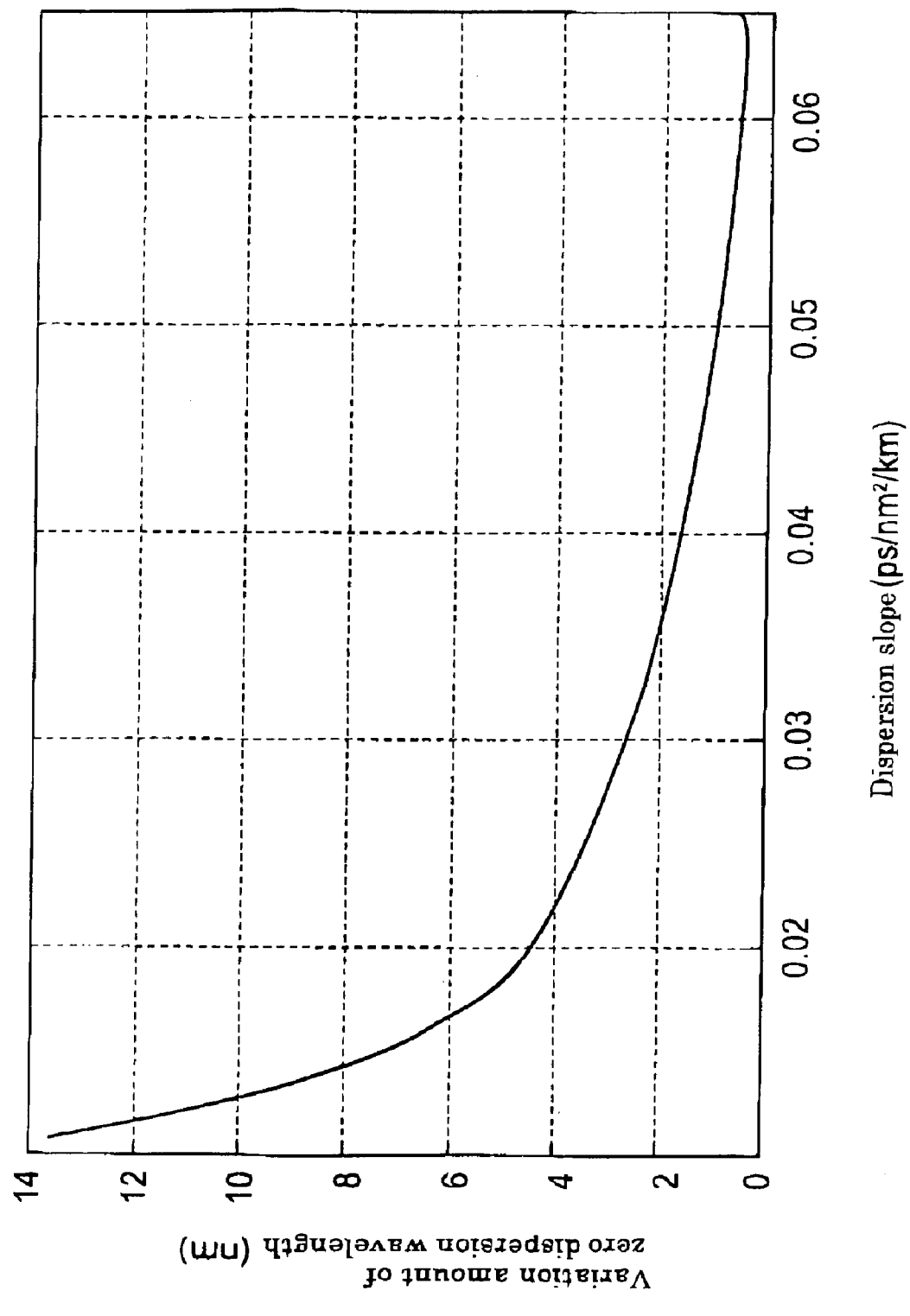
FIG. 11 is a graph showing a relationship between the dispersion slope of an optical fiber and the variation amount of zero dispersion wavelength in the longitudinal direction thereof.

FIG. 11 is a graph showing a relationship between the dispersion slope of an optical fiber and the variation amount of zero dispersion wavelength in the longitudinal direction thereof. Here, the optical fiber was assumed to have an effective area $A_{eff}$ of 8 to 12 μm², a nonlinear coefficient γ of 17 to 35/W/km according to the measurement by the XPM method, and core diameter variations of ±0.01% in the longitudinal direction. As shown in FIG. 11, there is a relationship between the dispersion slope and the variation of zero dispersion wavelength such that the smaller the former, the larger the latter.

Figure 12:
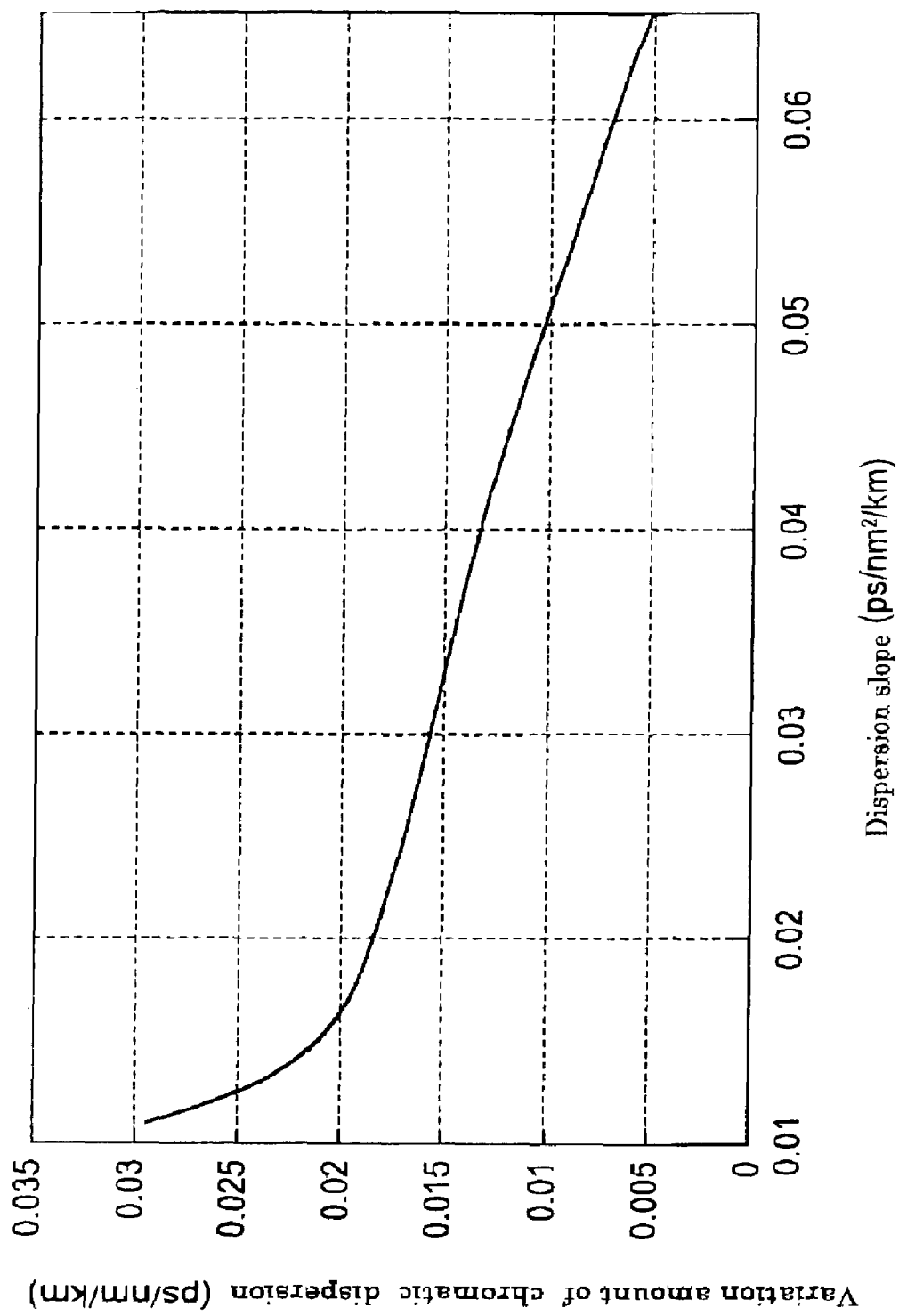
FIG. 12 is a graph showing a relationship between the dispersion slope of an optical fiber and the variation amount of chromatic dispersion in the longitudinal direction thereof.

FIG. 12 is a graph showing a relationship between the dispersion slope of an optical fiber and the variation amount of chromatic dispersion in the longitudinal direction thereof. Here, a case was assumed in which the core diameters vary ±0.01% in the longitudinal direction of the optical fiber. It is preferable if the variation of the core diameter be ±0.01%, since if the absolute value of the dispersion slope is 0.017 ps/nm²/km or more, the variation amount of the chromatic dispersion in the longitudinal direction becomes ±0.02 ps/nm/km or less, and therefore the wavelength conversion band becomes 40 nm or more even when the fiber length L is 500 m.

Figure 13:
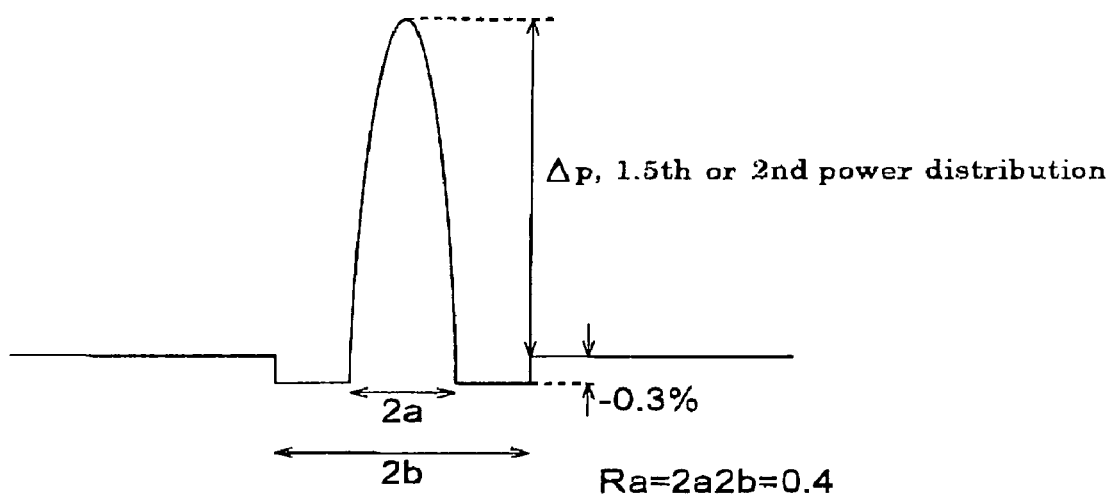
FIG. 13 shows a refractive index profile of an optical fiber.

Thus, there is a case in which the greater the dispersion slope, the smaller the variation of the chromatic dispersion in the longitudinal direction and the broader the wavelength conversion band. Next, an investigation was made as to what extent the wavelength slope can be increased. Here, the characteristics of the assumed optical fiber were as follows: the refractive index profile was W-type as shown in FIG. 13; the core portion had a structure which can be approximated with the distribution of 1.5th or second power distribution; the relative refractive index difference of the depressed portion was −0.3%; and the ratio Ra (=2a/2b) between the diameter (2a) of the core portion and the diameter (2b) of the depressed portion was 0.4.

The specification of the optical fiber is shown in Table III in the following order: maximum relative refractive index difference Δp of the core portion; profile shape parameter α; core diameter; effective area $A_{eff}$; nonlinear refractive index $n_2$; nonlinear coefficient γ; dispersion slope Slope; and the variation amount of zero dispersion wavelength when the core diameter varied ±0.5%.

TABLE III

| Δp % | α | Core diameter μm | $A_{eff}$ μm² | $n_2$ | γ W/km | Slope ps/nm²km | Variation amount of zero dispersion wavelength |
|---|---|---|---|---|---|---|---|
| 2.5 | 2.0 | 5.0 | 12.6 | 4.9 | 17 | 0.042 | 14 |
| 3.0 | 2.0 | 4.9 | 11.1 | 5.5 | 22 | 0.044 | 14 |
| 3.0 | 1.5 | 5.4 | 12.0 | 5.3 | 19 | 0.052 | 9 |
| 3.5 | 2.0 | 4.9 | 10.0 | 6.0 | 26 | 0.047 | 12 |
| 3.5 | 1.5 | 5.5 | 10.9 | 5.8 | 23 | 0.057 | 7 |
| 4.0 | 2.0 | 4.8 | 9.2 | 6.6 | 32 | 0.050 | 10 |
| 4.0 | 1.5 | 5.7 | 10.2 | 6.4 | 28 | 0.062 | 5 |
| 4.5 | 2.0 | 4.8 | 8.5 | 7.2 | 37 | 0.053 | 9 |

The wavelength of zero dispersion is 1550 nm, and the nonlinear coefficient γ and the dispersion slope are those at the 1550 nm wavelength. Thus, even in the case of comparatively simple W-type structure, the dispersion slope can be increased to about 0.062 ps/nm²/km. Also, the smaller the α, the smaller the nonlinear coefficient γ, and the larger the dispersion slope Slope.

An optical fiber according to another embodiment of the present invention is an optical fiber manufactured by a manufacturing method of the present invention, and has the following characteristics: the chromatic dispersion is −150 ps/nm/km or less at the 1550 nm wavelength; and the ratio ($D/D_{mean}$) between the chromatic dispersion D over a 10,000 m length at any arbitrarily selected position in the longitudinal direction and the average $D_{mean}$ of the chromatic dispersions in the whole length of the optional position is 0.8 or more and 1.2 or less.

A dispersion compensating fiber is used by dividing an optical fiber having a long length so that the desired amount of dispersion compensation can be obtained. In this case, in the conventional manufacturing methods, the longitudinal variation of chromatic dispersion is large, and the operation work has been troublesome with discarding the optical fiber in an extra amount. For example, if the average chromatic dispersion of an optical fiber after the division is greater than that of the optical fiber before the division, the amount of dispersion compensation will become inadequate, and if it is smaller than that of the optical fiber before the division, the amount of dispersion compensation will become so much that the optical fiber must be divided once again. If the variation of the chromatic dispersion is 20% or less of the dispersion average $D_{mean}$ of the full length, such wastefulness can fairly be reduced, and if it is 5% or less of the dispersion average $D_{mean}$ of the full length, and dividing the optical fiber once will be sufficient.

For example, in order to manufacture a dispersion compensating fiber having a chromatic dispersion of about −150 ps/nm/km at the 1.55 μm wavelength and the ratio of the chromatic dispersion/the dispersion slope of about 0.003 nm⁻¹, an optical fiber preform was prepared by demarcating the outer diameter using the statistically processed results of four repeated measurements of refractive index profiles, performing the grinding of the outer periphery, elongating so as to make the diameter to be uniform, and providing a cladding portion by the rod-in-collapse method. The variation in the ratio of after-fiber-drawing (chromatic dispersion)/(chromatic dispersion average $D_{mean}$) at the respective positions in the longitudinal direction of the optical fiber made by drawing the optical fiber preform was about 1.0±0.08, and was about 1.0±0.02 over 10 km or more of a satisfactory range. Also, in the case of an optical fiber manufactured from an optical preform made by demarcating the outer diameter using the results of measuring the refractive index profile once, implementing the grinding of the outer periphery, and processing further in a similar manner, the variation in the ratio of after-fiber-drawing (chromatic dispersion)/(chromatic dispersion average $D_{mean}$) was about 1.0±0.15, which was larger as compared with the case of the measure being done four times, but was sufficiently improved. On the other hand, in the case of an optical fiber produced by drawing an optical preform made from an intermediate preform which was not subjected to the grinding of the outer periphery, the variation in the ratio of after-fiber-drawing (chromatic dispersion)/(chromatic dispersion average $D_{mean}$) was as large as about 1.0±0.35.

Similar effects can be obtained in a case of a dispersion compensating fiber which is capable of compensating a slope exhibiting the following characteristics, for example: the chromatic dispersion at the 1.55 µm wavelength is about −350 ps/nm/km to −150 ps/nm/km with the ratio of the chromatic dispersion/the dispersion slope being about 0.003 $nm^{-1}$; the chromatic dispersion is about −300 ps/nm/km to −100 ps/nm/km with the ratio of the chromatic dispersion/ the dispersion slope being about 0.01 $nm^{-1}$; and the chromatic dispersion is about −250 ps/nm/km to −100 ps/nm/km with the ratio of the chromatic dispersion/the dispersion slope being about 0.02 $nm^{-1}$, and also in a case of an optical fiber that is only capable of compensating the chromatic dispersion of about −300 ps/nm/km or less with the positive slope of chromatic dispersion.

Figure 14:
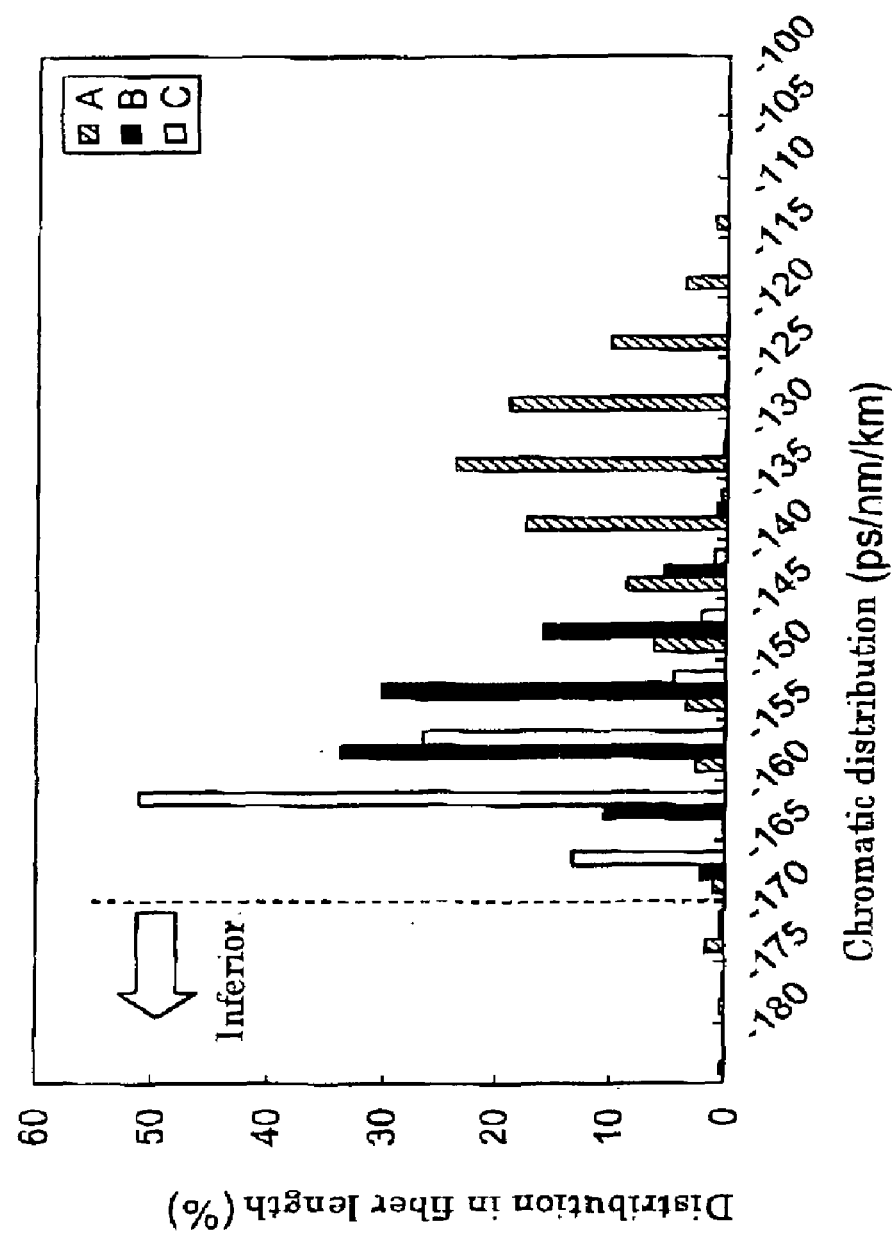
FIG. 14 is a histogram showing the respective distributions of chromatic dispersion of optical fibers in Cases A through C.

Next, Example 3 will be described. In Case A, no grinding of the outer periphery was done. In Case B, the grinding of the outer periphery was performed after the measurement of refractive index profiles was conducted once. In Case C, the grinding of the outer periphery was performed after the measurement of refractive index profiles was conducted four times. In each of Cases A through C, an optical fiber having a length of hundreds-of km was manufactured, and the distribution of the chromatic dispersion thereof at the 1.55 µm wavelength was investigated. FIG. 14 is a histogram showing the respective distributions of chromatic dispersion of optical fibers in Cases A through C. As a result, it can be seen that Case A exhibits a large distribution of the chromatic dispersion; the distribution of the chromatic dispersion is improved in Case B; and the distribution of the chromatic dispersion is further improved in Case C. In Cases C and B, it is possible to increase the manufacturing center value of the absolute value of the chromatic dispersion since the distribution of the chromatic dispersion is reduced.

One of the important characteristics of the dispersion compensating fiber is Figure of Merit (FOM), which is defined by the absolute value of the ratio of chromatic dispersion/transmission loss. The loss of a module can be decreased as a whole as the FOM increases. In the case where optical fiber preforms having the same profiles are fiber drawn, the grater the absolute value of the chromatic dispersion, the larger the FOM, since the transmission loss is the same. Also, if the amount of compensation of the chromatic dispersion of the module as a whole is the same, the greater the absolute value of the chromatic dispersion of the optical fiber, the shorter the optical fiber can be. Accordingly, the nonlinearity is reduced or the cost is lowered. Thus, in Cases B and C, it is possible to obtain, in a larger amount, optical fibers that exhibit high performance as a dispersion compensating fiber.

All of the descriptions disclosed in Japanese patent application No. 2005-113821 are herein incorporated by reference in their entirety.

What is claimed is:

1. A method of manufacturing an optical fiber preform having at least a core portion comprises the steps of:
   (1) preparing an intermediate preform for manufacturing an optical fiber preform;
   (2) measuring a refractive index profile in a radial direction at each of a plurality of positions in the longitudinal direction of the intermediate preform;
   (3) demarcating the outer diameter shape of the intermediate preform based on the result of the step of measuring the refractive index profile so that an optical fiber preform can be manufactured such that an optical fiber having target characteristics is to be produced from the optical fiber preform;
   (4) grinding the outer periphery of the intermediate preform so that the outer diameter shape may be formed as demarcated in the step of demarcating the outer diameter shape; and
   (5) elongating, so as to have a substantially constant outer diameter, the intermediate preform which has been subjected to the grinding step.

2. A method of manufacturing an optical fiber preform as specified in claim 1, wherein the step of elongation includes at least once a provisional elongation process for making a diameter greater than the desired diameter.

3. A method of manufacturing an optical fiber preform as specified in claim 1, further comprising the step of inserting the intermediate preform elongated in the step of elongation into a glass pipe and collapsing such that the intermediate preform and the glass pipe are consolidated.

4. A method of manufacturing an optical fiber preform as specified in claim 3, further comprising a second grinding step for grinding the outer periphery of an article formed by consolidating the intermediate preform and the glass pipe in the process of the consolidation.

5. A method of manufacturing an optical fiber preform as specified in claim 1, wherein in the step of measuring refractive index profiles, the refractive index profile measurement are performed a plurality of times at each of a plurality of positions along the longitudinal direction of the intermediate preform;
   in the step of demarcating the outer diameter shape, statistical processing is performed with respect to the results of the measurements thus performed plural times, and the outer diameter shape of the intermediate preform is demarcated based on the results of the statistical processing.

6. A method of manufacturing an optical fiber comprising the steps of:
   (1) preparing an intermediate preform for manufacturing an optical fiber preform;
   (2) measuring a refractive index profile in a radial direction at each of a plurality of positions in the longitudinal direction of the intermediate preform;
   (3) demarcating the outer diameter shape of the intermediate preform based on the result of the step of measuring the refractive index profile so that an optical fiber preform can be manufactured such that an optical fiber having target characteristics is to be produced from the optical fiber preform;
   (4) grinding the outer periphery of the intermediate preform so that the outer diameter shape may be formed as demarcated in the step of demarcating the outer diameter shape;

(5) elongating, so as to have a substantially constant outer diameter, the intermediate preform which has been subjected to the grinding step whereby an optical fiber preform is made; and (6) fiber-drawing the optical fiber preform.

7. An optical fiber manufactured by an optical fiber manufacturing method of claim 6, the optical fiber having an effective area of 12 µm$^2$ or less at the 1550 nm wavelength, a zero dispersion wavelength of 1470 nm to 1630 nm, and dispersion variations within ±0.02 ps/nm/km over a length of 1000 m.

8. An optical fiber as specified in claim 7, wherein the absolute value of the dispersion slope is 0.065 ps/nm$^2$/km or less at a zero dispersion wavelength.

9. An optical fiber as specified in claim 6, wherein the chromatic dispersion is −150 ps/nm/km or less at the 1550 nm wavelength; and the ratio ($D/D_{mean}$) between the chromatic dispersion D over a 10,000 m length at any arbitrarily selected position in the longitudinal direction and the average $D_{mean}$ of the chromatic dispersions in the whole length of the optional position is 0.8 or more and 1.2 or less.

* * * * *